US010776220B2

(12) United States Patent  
Horowitz et al.

(10) Patent No.: US 10,776,220 B2  
(45) Date of Patent: Sep. 15, 2020

(54) SYSTEMS AND METHODS FOR MONITORING DISTRIBUTED DATABASE DEPLOYMENTS

(71) Applicant: MongoDB, Inc., New York, NY (US)

(72) Inventors: Eliot Horowitz, New York, NY (US); John Morales, Basking Ridge, NJ (US)

(73) Assignee: MongoDB, Inc., New York, NY (US)

( * ) Notice: Subject to any disclaimer, the term of this patent is extended or adjusted under 35 U.S.C. 154(b) by 23 days.

(21) Appl. No.: 15/627,672

(22) Filed: Jun. 20, 2017

(65) Prior Publication Data

US 2017/0371968 A1 Dec. 28, 2017

Related U.S. Application Data

(60) Provisional application No. 62/355,087, filed on Jun. 27, 2016.

(51) Int. Cl.

| | | |
|---|---|---|
| G06F 11/14 | (2006.01) | |
| G06F 16/904 | (2019.01) | |
| G06F 16/9038 | (2019.01) | |
| G06F 16/9535 | (2019.01) | |
| G06F 16/903 | (2019.01) | |
| G06F 11/32 | (2006.01) | |

(Continued)

(52) U.S. Cl.  
CPC ...... *G06F 11/1469* (2013.01); *G06F 11/3089* (2013.01); *G06F 11/328* (2013.01); *G06F 16/904* (2019.01); *G06F 16/9038* (2019.01); *G06F 16/90335* (2019.01); *G06F 16/9535* (2019.01); *H04L 65/1069* (2013.01); *H04L 67/1097* (2013.01); *G06F 2201/805* (2013.01); *G06F 2201/84* (2013.01)

(58) Field of Classification Search  
CPC ............ G06F 11/1469; G06F 11/3089; G06F 11/328; G06F 16/90335; G06F 16/9535; G06F 16/9038; G06F 16/904; G06F 2201/805; G06F 2201/84; H04L 67/1097; H04L 65/1069

See application file for complete search history.

(56) References Cited

U.S. PATENT DOCUMENTS

| | | |
|---|---|---|
| 4,918,593 A | 4/1990 | Huber |
| 5,379,419 A | 1/1995 | Heffernan et al. |

(Continued)

OTHER PUBLICATIONS

Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

(Continued)

*Primary Examiner* — Cam Y T Truong  
(74) *Attorney, Agent, or Firm* — Wolf, Greenfield & Sacks, P.C.

(57) ABSTRACT

One aspect relates to a system that integrates a user interface of a device with a cloud based database system without use of a database application. A user may access a cloud based database system without the complexity of installing additional software or managing connections to the cloud based database system. The system may establish a communication link between the user interface and intelligent agents running on the database system in order to allow a user(s) to carry out various database monitoring and verification activities.

18 Claims, 11 Drawing Sheets

(51) Int. Cl.
*G06F 11/30* (2006.01)
*H04L 29/06* (2006.01)
*H04L 29/08* (2006.01)

(56) References Cited

U.S. PATENT DOCUMENTS

| | | | |
|---|---|---|---|
| 5,416,917 A | 5/1995 | Adair et al. | |
| 5,471,629 A | 11/1995 | Risch | |
| 5,551,027 A | 8/1996 | Choy et al. | |
| 5,598,559 A | 1/1997 | Chaudhuri | |
| 5,710,915 A | 1/1998 | McElhiney | |
| 5,884,299 A | 3/1999 | Ramesh et al. | |
| 5,999,179 A | 12/1999 | Kekic et al. | |
| 6,065,017 A | 5/2000 | Barker | |
| 6,088,524 A | 7/2000 | Levy et al. | |
| 6,112,201 A * | 8/2000 | Wical | G06F 16/38 |
| 6,115,705 A | 9/2000 | Larson | |
| 6,240,406 B1 | 5/2001 | Tannen | |
| 6,240,514 B1 | 5/2001 | Inoue et al. | |
| 6,249,866 B1 | 6/2001 | Brundett et al. | |
| 6,324,540 B1 | 11/2001 | Khanna et al. | |
| 6,324,654 B1 | 11/2001 | Wahl et al. | |
| 6,339,770 B1 | 1/2002 | Leung et al. | |
| 6,351,742 B1 | 2/2002 | Agarwal et al. | |
| 6,363,389 B1 | 3/2002 | Lyle et al. | |
| 6,385,201 B1 | 5/2002 | Iwata | |
| 6,385,604 B1 | 5/2002 | Bakalash et al. | |
| 6,496,843 B1 * | 12/2002 | Getchius | G06F 16/957 715/210 |
| 6,505,187 B1 | 1/2003 | Shatdal | |
| 6,611,850 B1 | 8/2003 | Shen | |
| 6,687,846 B1 | 2/2004 | Adrangi et al. | |
| 6,691,101 B2 | 2/2004 | MacNicol et al. | |
| 6,801,905 B2 | 10/2004 | Andrei | |
| 6,823,474 B2 | 11/2004 | Kampe et al. | |
| 6,920,460 B1 | 7/2005 | Srinivasan et al. | |
| 6,959,369 B1 | 10/2005 | Ashton et al. | |
| 7,020,649 B2 | 3/2006 | Cochrane et al. | |
| 7,032,089 B1 | 4/2006 | Ranade et al. | |
| 7,082,473 B2 | 7/2006 | Breitbart et al. | |
| 7,177,866 B2 | 2/2007 | Holenstein et al. | |
| 7,181,460 B2 | 2/2007 | Coss et al. | |
| 7,191,299 B1 | 3/2007 | Kekre et al. | |
| 7,246,345 B1 | 7/2007 | Sharma et al. | |
| 7,447,807 B1 | 11/2008 | Merry et al. | |
| 7,467,103 B1 | 12/2008 | Murray et al. | |
| 7,469,253 B2 | 12/2008 | Celis et al. | |
| 7,472,117 B2 | 12/2008 | Dettinger et al. | |
| 7,486,661 B2 | 2/2009 | Van den Boeck et al. | |
| 7,548,928 B1 | 6/2009 | Dean et al. | |
| 7,552,356 B1 | 6/2009 | Waterhouse et al. | |
| 7,558,481 B2 | 7/2009 | Jenkins et al. | |
| 7,567,991 B2 | 7/2009 | Armangau et al. | |
| 7,617,369 B1 | 11/2009 | Bezbaruah et al. | |
| 7,634,459 B1 | 12/2009 | Eshet et al. | |
| 7,647,329 B1 | 1/2010 | Fischman et al. | |
| 7,657,570 B2 | 2/2010 | Wang et al. | |
| 7,657,578 B1 | 2/2010 | Karr et al. | |
| 7,668,801 B1 | 2/2010 | Koudas et al. | |
| 7,761,465 B1 | 7/2010 | Nonaka et al. | |
| 7,957,284 B2 | 6/2011 | Lu et al. | |
| 7,962,458 B2 | 6/2011 | Holenstein et al. | |
| 8,005,804 B2 | 8/2011 | Greer | |
| 8,005,868 B2 | 8/2011 | Saborit et al. | |
| 8,037,059 B2 | 10/2011 | Bestgen et al. | |
| 8,078,825 B2 | 12/2011 | Oreland et al. | |
| 8,082,265 B2 | 12/2011 | Carlson et al. | |
| 8,086,597 B2 | 12/2011 | Balmin et al. | |
| 8,099,572 B1 | 1/2012 | Arora et al. | |
| 8,103,906 B1 | 1/2012 | Alibakhsh et al. | |
| 8,108,443 B2 | 1/2012 | Thusoo | |
| 8,126,848 B2 | 2/2012 | Wagner | |
| 8,170,984 B2 | 5/2012 | Bakalash et al. | |
| 8,260,840 B1 | 9/2012 | Sirota et al. | |
| 8,296,419 B1 | 10/2012 | Khanna et al. | |
| 8,305,999 B2 | 11/2012 | Palanki et al. | |
| 8,321,558 B1 | 11/2012 | Sirota et al. | |
| 8,352,450 B1 | 1/2013 | Mraz et al. | |
| 8,352,463 B2 | 1/2013 | Nayak | |
| 8,363,961 B1 | 1/2013 | Avidan et al. | |
| 8,370,857 B2 | 2/2013 | Kamii et al. | |
| 8,386,463 B2 | 2/2013 | Bestgen et al. | |
| 8,392,482 B1 | 3/2013 | McAlister et al. | |
| 8,539,197 B1 | 9/2013 | Marshall et al. | |
| 8,572,031 B2 | 10/2013 | Merriman et al. | |
| 8,589,382 B2 | 11/2013 | Betawadkar-Norwood | |
| 8,589,574 B1 | 11/2013 | Cormie et al. | |
| 8,615,507 B2 | 12/2013 | Varadarajulu et al. | |
| 8,712,044 B2 | 4/2014 | MacMillan et al. | |
| 8,712,993 B1 | 4/2014 | Ordonez | |
| 8,751,533 B1 | 6/2014 | Dhavale et al. | |
| 8,843,441 B1 | 9/2014 | Rath et al. | |
| 8,869,256 B2 | 10/2014 | Sample | |
| 8,996,463 B2 | 3/2015 | Merriman et al. | |
| 9,015,431 B2 | 4/2015 | Resch et al. | |
| 9,069,827 B1 | 6/2015 | Rath et al. | |
| 9,116,862 B1 | 8/2015 | Rath et al. | |
| 9,141,814 B1 | 9/2015 | Murray | |
| 9,183,254 B1 | 11/2015 | Cole et al. | |
| 9,262,462 B2 | 2/2016 | Merriman et al. | |
| 9,268,639 B2 | 2/2016 | Leggette et al. | |
| 9,274,902 B1 | 3/2016 | Morley et al. | |
| 9,317,576 B2 | 4/2016 | Merriman et al. | |
| 9,350,633 B2 | 5/2016 | Cudak et al. | |
| 9,350,681 B2 | 5/2016 | Kitagawa et al. | |
| 9,460,008 B1 | 10/2016 | Leshinsky et al. | |
| 9,495,427 B2 | 11/2016 | Abadi et al. | |
| 9,569,481 B1 | 2/2017 | Chandra et al. | |
| 9,660,666 B1 | 5/2017 | Ciarlini et al. | |
| 9,715,433 B2 | 7/2017 | Mu et al. | |
| 9,740,762 B2 | 8/2017 | Horowitz et al. | |
| 9,792,322 B2 | 10/2017 | Merriman et al. | |
| 9,800,685 B2 | 10/2017 | Neerincx et al. | |
| 9,805,108 B2 | 10/2017 | Merriman et al. | |
| 9,881,034 B2 | 1/2018 | Horowitz et al. | |
| 9,959,308 B1 | 5/2018 | Carman et al. | |
| 10,031,931 B2 | 7/2018 | Horowitz et al. | |
| 10,031,956 B2 | 7/2018 | Merriman et al. | |
| 10,262,050 B2 | 4/2019 | Bostic et al. | |
| 10,303,570 B2 | 5/2019 | Nakajima | |
| 10,346,430 B2 | 7/2019 | Horowitz et al. | |
| 10,346,434 B1 | 7/2019 | Morkel et al. | |
| 10,366,100 B2 | 7/2019 | Horowitz et al. | |
| 10,372,926 B1 | 8/2019 | Leshinsky et al. | |
| 10,394,822 B2 | 8/2019 | Stearn | |
| 10,423,626 B2 | 9/2019 | Stearn et al. | |
| 10,430,433 B2 | 10/2019 | Stearn et al. | |
| 10,474,645 B2 | 11/2019 | Freedman et al. | |
| 10,489,357 B2 | 11/2019 | Horowitz et al. | |
| 10,496,669 B2 | 12/2019 | Merriman et al. | |
| 10,614,098 B2 | 4/2020 | Horowitz et al. | |
| 10,621,050 B2 | 4/2020 | Horowitz et al. | |
| 10,621,200 B2 | 4/2020 | Merriman et al. | |
| 2001/0021929 A1 * | 9/2001 | Lin | G06F 16/24 |
| 2002/0029207 A1 | 3/2002 | Bakalash et al. | |
| 2002/0065675 A1 | 5/2002 | Grainger et al. | |
| 2002/0065676 A1 | 5/2002 | Grainger et al. | |
| 2002/0065677 A1 | 5/2002 | Grainger et al. | |
| 2002/0143901 A1 | 10/2002 | Lupo et al. | |
| 2002/0147842 A1 | 10/2002 | Breitbart et al. | |
| 2002/0184239 A1 | 12/2002 | Mosher, Jr. et al. | |
| 2003/0046307 A1 * | 3/2003 | Rivette | G06F 16/34 |
| 2003/0084073 A1 | 5/2003 | Hotti et al. | |
| 2003/0088659 A1 | 5/2003 | Susarla et al. | |
| 2003/0182427 A1 | 9/2003 | Halpern | |
| 2003/0187864 A1 | 10/2003 | McGoveran | |
| 2004/0078569 A1 | 4/2004 | Hotti | |
| 2004/0133591 A1 | 7/2004 | Holenstein et al. | |
| 2004/0168084 A1 | 8/2004 | Owen et al. | |
| 2004/0186817 A1 | 9/2004 | Thames et al. | |
| 2004/0186826 A1 | 9/2004 | Choi et al. | |
| 2004/0205048 A1 | 10/2004 | Pizzo et al. | |
| 2004/0236743 A1 | 11/2004 | Blaicher et al. | |
| 2004/0254919 A1 | 12/2004 | Giuseppini | |

(56) References Cited

U.S. PATENT DOCUMENTS

| | | |
|---|---|---|
| 2005/0027796 A1* | 2/2005 | San Andres .......... G06F 11/201 709/203 |
| 2005/0033756 A1 | 2/2005 | Kottomtharayil |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1* | 1/2006 | Prompt ................. G06F 16/252 |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0203944 A1 | 8/2007 | Batra et al. |
| 2007/0226640 A1* | 9/2007 | Holbrook .............. G06F 16/951 715/765 |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0307338 A1 | 12/2011 | Carlson |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1* | 6/2012 | Gaede ................. G06Q 20/32 235/375 |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1* | 11/2015 | Hsiao ................... G06F 16/26 715/735 |
| 2015/0378786 A1 | 12/2015 | Suparna et al. |
| 2016/0005423 A1 | 1/2016 | Neppalli et al. |
| 2016/0048345 A1 | 2/2016 | Vijayrao et al. |
| 2016/0110284 A1 | 4/2016 | Athalye et al. |
| 2016/0110414 A1* | 4/2016 | Park ................... G06F 16/2453 707/716 |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2018/0004801 A1 | 1/2018 | Burchall et al. |

(56) References Cited

U.S. PATENT DOCUMENTS

| | | | |
|---|---|---|---|
| 2018/0004804 A1 | 1/2018 | Merriman et al. | |
| 2018/0095852 A1 | 4/2018 | Keremane et al. | |
| 2018/0096045 A1 | 4/2018 | Merriman et al. | |
| 2018/0165338 A1 | 6/2018 | Kumar et al. | |
| 2018/0173745 A1 | 6/2018 | Balasubramanian et al. | |
| 2018/0300209 A1 | 10/2018 | Rahut | |
| 2018/0300381 A1 | 10/2018 | Horowitz et al. | |
| 2018/0300385 A1 | 10/2018 | Merriman et al. | |
| 2018/0314750 A1 | 11/2018 | Merriman et al. | |
| 2018/0343131 A1* | 11/2018 | George | H04L 12/06 |
| 2018/0365114 A1 | 12/2018 | Horowitz | |
| 2019/0102410 A1 | 4/2019 | Horowitz et al. | |
| 2019/0303382 A1 | 10/2019 | Bostic et al. | |
| 2020/0097486 A1 | 3/2020 | Horowitz et al. | |

OTHER PUBLICATIONS

U.S. Appl. No. 16/588,739, filed Sep. 30, 2019, Stearn et al.
U.S. Appl. No. 15/074,987, filed Mar. 18, 2016, Merriman.
U.S. Appl. No. 15/654,590, filed Jul. 19, 2017. Horowitz et al.
U.S. Appl. No. 15/706,593, filed Sep. 15, 2017, Merriman et al.
U.S. Appl. No. 15/721,176, filed Sep. 29, 2017, Merriman et al.
U.S. Appl. No. 15/200,721, filed Jul. 1, 2016, Merriman.
U.S. Appl. No. 15/200,975, filed Jul. 1, 2016, Merriman.
U.S. Appl. No. 14/992,225, filed Jan. 11, 2016, Bostic et al.
U.S. Appl. No. 16/035,370, filed Jul. 13, 2018, Horowitz et al.
U.S. Appl. No. 15/605,512, filed May 25, 2017, Horowitz et al.
U.S. Appl. No. 15/605,143, filed May 25, 2017, Horowitz.
U.S. Appl. No. 15/605,391, filed May 25, 2017, Horowitz.
U.S. Appl. No. 15/390,345, filed Dec. 23, 2016, Stearn et al.
U.S. Appl. No. 15/390,351, filed Dec. 23, 2016, Stearn et al.
U.S. Appl. No. 15/390,364, filed Dec. 23, 2016, Stearn et al.
U.S. Appl. No. 15/604,879, filed May 25, 2017, Horowitz.
U.S. Appl. No. 15/604,856, filed May 25, 2017, Horowitz et al.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/605,426, filed May 25, 2017, Horowitz et al.
U.S. Appl. No. 15/627,502, filed Jun. 20, 2017, Horowitz et al.
U.S. Appl. No. 16/013,345, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].
Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides. http://www.slideshare.net/mongodb/mms-automation-mongo-db-world.
Poder, Oracle living books. 2009. <http://tech.e2sn.com/oracle/sql/oracle-execution-plan-operation-reference>.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Wilkins et al., Migrate DB2 applications to a partitioned database. developerWorks, IBM. Apr. 24, 2008, 33 pages.
U.S. Appl. No. 16/846,916, filed Apr. 13, 2020, Horowitz et al.

* cited by examiner

SYSTEMS AND METHODS FOR MONITORING DISTRIBUTED DATABASE DEPLOYMENTS

RELATED APPLICATIONS

This application claims priority under 35 U.S.C. § 119(e) to U.S. Provisional Application Ser. No. 62/355,087, entitled "SYSTEM AND METHOD FOR MANAGING DISTRIBUTED DATABASE DEPLOYMENTS" filed on Jun. 27, 2016, which is herein incorporated by reference in its entirety.

BACKGROUND

Cloud based services may be offered for running, using, and maintaining a database. A cloud based database service may include a plurality of servers hosting databases associated with a plurality of users. It is appreciated that many users of a cloud based database service may want functionality offered of low level control interfaces without the hassle and complexity of configuring a database and connecting to it. For example, users (e.g., developers, database administrators, analysts, etc.) may want to monitor data, verify data, and optimize performance. Current database systems may require installation of applications on client devices or accessing of another external application(s) in order to access information from a database. Users may further have to manage complex configurations and connections to connect to a database.

SUMMARY

Accordingly, there is a need for a system capable of integrating client devices with database deployments of a cloud based database service (e.g., MongoDB Atlas) without needing a separate application or control interface. By retrieving information from a database deployment and generating user interface views through which users can view the information, a user interface may be integrated directly with the cloud based database service. In some embodiments, a system is provided that connects to intelligent agents running on servers of a database deployment and retrieves database deployment information from the intelligent agents. The system further generates a user interface to display in client devices to allow users to view the retrieved information. Additionally, the system may receive user requests for data stored in the database deployment and transmit them for execution by intelligent agents. The system may retrieve the results from execution of the query and generate visualizations of the retrieved data. In some embodiments, the system includes various operational features and components to ensure efficiency of information retrieval, security, and reliability.

According to some embodiments, a system is provided to integrate a user interface shown in a display of a client device with a cloud based database service (e.g., MongoDB Atlas) without a need of any additional database application. The system may receive a request to access a cloud based database service via a user interface of a client device. In response to the request, the system may use a network interface (e.g., Internet connection) to establish a communication link between the user interface and the database service. The system may then retrieve information from the database service and generate visualizations of the information in views of the user interface. The system may further receive user requests for data stored in the database service via the user interface and display retrieved data in views of the user interface.

According to one aspect, a system for monitoring a cloud based distributed database is provided. The system comprises a network interface; at least one processor operatively connected to a memory, the at least one processor configured to execute a plurality of system components comprising: a user interface component configured to: accept, from a client device via a user interface shown in a display of the client device, a request to access a database deployment, wherein the database deployment comprises at least one intelligent agent running on at least one server of the database deployment; an integration component configured to: establish, via the network interface, a communication link between the user interface shown in the display of the client device and the at least one intelligent agent; and retrieve, via the communication link, database deployment information from the at least one intelligent agent; and wherein the user interface component is further configured to generate, within one or more views of the user interface, one or more visualizations of the retrieved information.

According to one embodiment, establishing the communication link includes establishing a direct connection between the client device and the at least one intelligent agent.

According to one embodiment, the user interface is further configured to bypass a database application to obtain monitoring information on database usage.

According to one embodiment, the user interface component is further configured to: accept, via the user interface, a query for data stored in the database deployment; and wherein the integration component is further configured to: transmit, via the communication link, the query to the at least one intelligent agent wherein the at least one intelligent agent is configured to execute the query and retrieve the data; and receive, via the communication link in response to transmitting the query, the data from the at least one intelligent agent; and the user interface component is further configured to generate, within a view of the one or more views, at least one visualization of the data.

According to one embodiment, the system further comprises a data cache component configured to: store the retrieved query data on the client device for a period of time after retrieval; retransmit the query for execution responsive to a request to view the data after expiration of the period of time; and retrieve the query data from the client device responsive to a request to view the data prior to expiration of the time period.

According to one embodiment, the integration component is further configured to retrieve the database deployment information in real time and the user interface component is further configured to update visualizations of the retrieved information according to the real time information.

According to one embodiment, the act of retrieving database deployment information comprises: retrieving statistical information about one or more collections of at least one database stored in the database deployment; and retrieving index information of the one or more collections.

According to one embodiment, the act of retrieving index information comprises retrieving at least one or more of a list of one or more indexes, sizes of the one or more indexes, keys of the one of or more indexes, rates of access of the one or more indexes, and hashes of the one or more indexes.

According to one embodiment, establishing the communication link between the user interface and the at least one intelligent agent comprises establishing a communication link with a plurality intelligent agents running on a plurality of nodes and the integration component is configured to: retrieve information from a first intelligent agent of the plurality of intelligent agents running on a first node of the plurality of nodes; receive an indication from the first intelligent agent that the first node is unavailable; and retrieve, responsive to receiving the indication, information from a second intelligent agent of the plurality of agents running on a second node of the plurality of nodes.

According to one embodiment, the integration component is further configured to: receive, from the client device, an indication to end access to the database deployment; and stop retrieval of information from the database deployment responsive to receiving the indication.

According to one embodiment, the system further comprises an access manager, executed by the at least one processor, configured to: authenticate the identity of the user; determine a role of the user; and provide access to the retrieved information according to the role of the user.

According to one embodiment, the system further comprises a data cache component configured to: store retrieved information on the client device while the communication link is established; disconnect the communication link; and clear the stored information responsive to disconnecting the communication link.

According to one aspect, a method for monitoring a cloud based distributed database is provided. The method comprises acts of: accepting, from a client device via a user interface shown in a display of the client device, a request to access a database deployment, wherein the database deployment comprises at least one intelligent agent running on at least one server of the database deployment; establishing, via a network interface, a communication link between the user interface shown in the display of the client device and the at least one intelligent agent; retrieving information from the at least one intelligent agent via the communication link; and generating, within one or more views of the user interface, one or more visualizations of the retrieved information.

According to one embodiment, the act of establishing the communication link includes establishing a direct connection between the client device and the at least one intelligent agent.

According to one embodiment, the method further comprises an act of bypassing a database application to obtain monitoring information on database usage.

According to one embodiment, the method further comprises comprising acts of: accepting, via the user interface, a query for data stored in the database deployment; and transmitting, via the communication link, the query to the at least one intelligent agent wherein the at least one intelligent agent is configured to execute the query and retrieve the data; and receiving, via the communication link in response to transmitting the query, the data from the at least one intelligent agent; and generating, within a view of the one or more views, at least one visualization of the data.

According to one embodiment, the act of retrieving the database deployment information comprises retrieving the information in real time and the act of generating the one or more visualizations further comprises updating the one or more visualizations according to the real time information.

According to one embodiment, the method further comprises acts of: receiving, from the client device, an indication to end access to the database deployment; and stopping retrieval of information from the at least one intelligent agent responsive to receiving the indication.

According to one embodiment, the act of establishing the communication link with the at least one intelligent agent comprises connecting to a plurality of intelligent agents running on a plurality of nodes and the act of retrieving information comprises: retrieving information from a first intelligent agent of the plurality of intelligent agents running on a first node of the plurality of nodes; receiving an indication that the first node is unavailable; and retrieving, responsive to receiving the indication, information from a second intelligent agent of the plurality of intelligent agents running on a second node of the plurality of nodes.

According to one embodiment, the method further comprises acts of: authenticating and identity of a user of the client device; determining a role of the user; and providing access to the retrieved information according to the role of the user.

According to another aspect, a cloud based distributed database system is provided. The system comprises: a network interface; at least one database; at least one processor operatively connected to a memory, the at least one processor configured to execute a plurality of system components comprising: at least one intelligent agent configured to: connect, via the network interface, to at least one client system; collect monitoring information from the distributed data system; transmit, responsive to the act of connecting, the monitoring information to the at least one client system; receive, from the client system, a query for data stored in the at least one database; execute the query; retrieve, responsive to execution of the query, at least one data item from the at least one database; and transmit the retrieved at least one data item to the client system.

According to one aspect, a user interface is provided. The user interface comprises: a user interface component, executed by at least one processor, operable to display at least one user interface, wherein the at least one user interface is configured to display and accept information from a database deployment through a plurality of views, the plurality of views including: a first view configured to: display a list of one or more databases in the database deployment; and accept selection of a database of the one or more databases; a database level view configured to: visualize information about one or more collections in the database; and receive selection of a collection of the one or more collections; and a find view configured to: accept a query for data in the selected collection; and display a visual representation of the queried data.

According to one embodiment, the first view is further configured to display a filterable list of the one or more databases for navigation.

According to one embodiment, the first view is further configured to display a total number of the one or more databases.

According to one embodiment, the plurality of views include an index view configured to display index information for one or more indexes of the selected collection.

According to one embodiment, the query results comprise one or more pages of retrieved data and the find view is further configured to: display a single page of the one or more pages; and provide page backward and page forward options to allow navigation through the one or more pages of the results.

According to one embodiment, the user interface component is configured to display statistics associated with the selected collection in a header of the at least one user interface.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
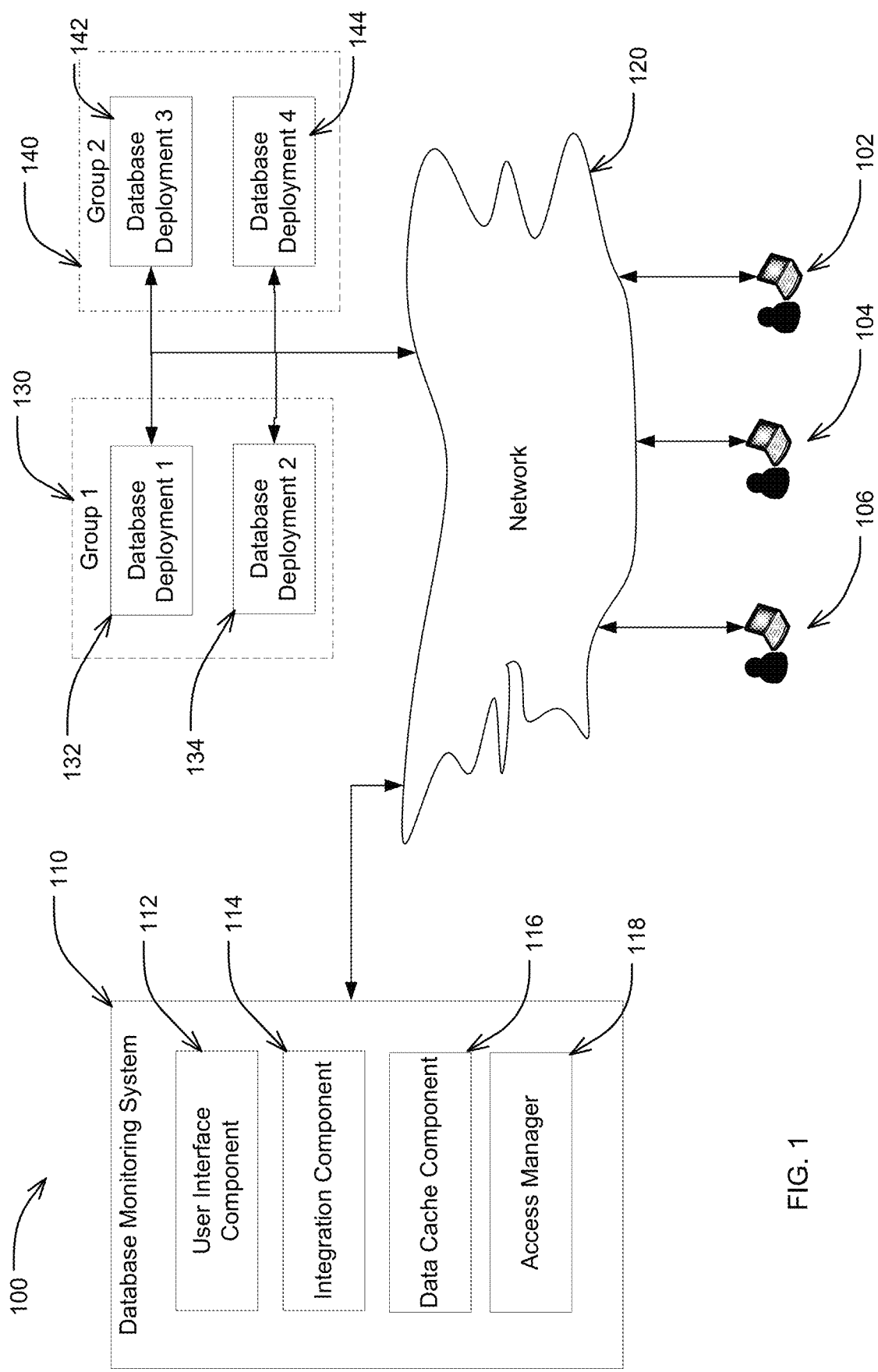
FIG. 1 shows a block diagram of a cloud based database system, according to one aspect of the present invention.

Some current systems require separate database applications to interact with cloud based database systems. For example, a separate database application may be required to be installed on a device and users interact with their database data through the database application. For example, to carry out various activities associated with a database such as inserting, deleting, monitoring, backing up, updating, and verifying data stored in the database. Users may further need to access the database application to monitor performance of the database system. For example, a user may need the application to view memory usage, disk usage, storage capacity, network connections, and other parameters of the database system. Typically, such database application(s) require users to configure the database and a connection to the database through the database application.

It is appreciated that many users of a cloud based database service (e.g., MongoDB Atlas) may want functionality offered by low level control interfaces (e.g., MongoDB Shell), without the need to interact with separate applications. Further, users may want the functionality without the complexity associated with configuring a database application and/or system and managing connections to the database. According to some embodiments, data verification, monitoring, and performance optimization are ongoing processes for users of a database that can be executed separately and apart from other database functions. Various embodiments are configured to enable users (e.g., developers, database administrators, analysts, etc.) to monitor data, verify data, and optimize performance of a database system without having to connect through an additional application, configure a database, and or manage a connection to the database system. Various aspects eliminate any performance impact (e.g., computation and memory usage) associated with accessing your database application to review monitoring data and/or fine tuning backend configurations. For example, various embodiments provide a system that integrates a user interface directly with a database back end to enable users to monitor data, verify data, and optimize performance.

Accordingly, various embodiments relate to a system to integrate a user interface shown in a display of a client device with a cloud based database service (e.g., MongoDB Atlas) without a need to access any front end systems or the database application itself. According to one embodiment, the system may receive a request to access a cloud based database service via a user interface of the client device. The system can be configured to use a network interface (e.g., Internet connection) to establish a communication link between the user interface and intelligent agents running on the database back end. According to one embodiment, the system is configured to enable connections between a user interface on a client computer and intelligent agents running on the back end of the database system. The system may then retrieve information from the intelligent agent(s) and generate visualizations of the information in views of the user interface. The system may further receive user requests for data stored in the database service via the user interface and display retrieved data in views of the user interface. In some embodiments, the system may allow users of a database service to carry out monitoring, verification, and optimization activities without complexities of and resource usage of an additional database application.

A cloud based database service may comprise of a plurality of database deployments. A database deployment may comprise a cluster of one or more servers hosting one or more databases (e.g., MongoDB Atlas cluster). Stated broadly, various aspects herein describe systems and methods for viewing, analyzing, and monitoring database deployments without use of a database application. In one embodiment, this involves a system that integrates a user interface of a client device(s) with a database deployment(s). This may involve determining database deployments associated with particular users, establishing a communicative link with a server(s) of a database deployment(s), authenticating users, accessing information from the server(s), managing access to information from the server(s) from a plurality of client devices, and providing a user interface through which users can access information from the database deployment(s).

It is appreciated that there may be challenges associated with managing requests and accesses of a plurality of client systems to a cloud bases database service. According to one aspect, systems and methods are provided to maintain efficiency of operation to provide optimal performance and availability to users accessing databases through the database monitoring system. For example, cloud based database systems may need to manage real time information transmissions to client devices and to ensure availability and efficiency for users viewing data at a given time. In another example, the system may need to ensure that client device connections and information retrieval are maintained during various operations associated with the databases (e.g., rebalancing, database node restarts, etc.).

According to another aspect, the system is further configured to facilitate user access and interactions to the databases. In some embodiments, the system may provide various visualization and navigation interfaces via which a user(s) can interact with a database deployment. For example, a user(s) can view, monitor, and verify data stored in the database deployment. The user(s) may further view performance information about the database deployment.

The disclosure provided herein is not limited in its application to the details of construction and the arrangement of components set forth in the following description or illustrated drawings. The disclosure is capable of other embodiments and of being practiced or of being carried out in various ways. Also, the phraseology and terminology used herein is for the purpose of description and should not be regarded as limiting. The use of "including", "comprising", "having", "containing", "involving", and variations therein is meant to encompass the items listed thereafter and equivalents thereof as well as additional items.

FIG. 1 illustrates an example environment 100 in which interactions may take place, in accordance with some embodiments. In this example, the environment 100 includes a database monitoring system 110 in communication with a plurality of client devices 102, 104, 106 over network 120. A client device may comprise a computer, smart phone, or other device. Further, the database monitoring system 110 may communicate, over the network 120, with a plurality of database deployments 132, 134, 142, 144. The network 120 may comprise the Internet, a local area network (LAN), or any other network over which communications may take place as embodiments are not limited in this respect.

In some embodiments, the database monitoring system 110 may integrate devices 102, 104, 106 with one or more database deployments 132, 134, 142, 144. In one implementation, the database monitoring system 110 may enable a client device to access information from one or more database deployments 132, 134, 142, 144 via an Internet browser application, mobile application, or other application. For example, a user may access a particular Internet website or specific mobile application in order to gain access to a database deployment. The integration component 114 may establish a connection between the client device and a database deployment to enable a user(s) to execute various activities such as view performance metrics about a database deployment(s) (e.g., databases 132, 134, 142, 144) and query for data stored in the database deployment.

In some embodiments, a database deployment (e.g., one of database deployments 132, 134, 142, 144) may comprise a cluster of one or more servers hosting one or more databases. According to various embodiments, a database as described in U.S. application Ser. No. 15/605,372 entitled "METHODS AND APPARATUS FOR MAINTAINING REPLICA SETS" incorporated by reference herein may be stored in a database deployment.

In some embodiments, a database may be replicated to form a replica set. The replica set may be hosted by a plurality of nodes, each node hosting a replica of the database. The plurality of nodes may be distributed across one or more servers of a database deployment. In some embodiments, a database may be divided into units called shards. Each shard may be replicated via a replica set. A database deployment (e.g., a cluster) may contain one or more replica sets associated with one or more databases or shards.

In some embodiments, a database may comprise a non-relational database (e.g., a MongoDB database). A document may represent an individual data item stored in the database. In some embodiments, a document may include plurality of fields with associated values. For example, a non-relational database for an e-commerce website may store transaction information in documents. A document storing information for a transaction may, for example, include fields for transaction date, amount, and items purchased among other fields.

In some embodiments, a database may further include a plurality of collections. A collection is a grouping of documents within a database. For example, a non-relational database storing information for an e-commerce website may store the information in documents which are grouped into collections. A collection may, for example, comprise documents for transactions executed on the e-commerce website on a particular date.

In some embodiments, a collection may have one or more indexes associated with it. An index may store a portion of the collection's dataset in an easy to traverse form. In some embodiments, any field of a document may be used to create an index for a collection. In one implementation, an index stores the value of a specific field or set of fields of documents in the collection and orders the index entries according to the value of the field. In some embodiments, an index may additionally or alternatively store hashes of a specific field or set of fields of documents in the collection. The ordering of the index may, for example, support efficient equality matches and querying of ranges of data from a collection. Further, the index may be used to sort query results.

In some embodiments, a database deployment can also be configured to include one or more intelligent agents running on servers of the database deployment. In some embodiments, an intelligent agent can be configured to monitor various processes (e.g., MongoDB processes) executing in the database deployment. Additionally, the intelligent agent can be configured to collect information about the state of the database deployment (e.g., performance information, storage capacity, configuration). The intelligent agent can also be configured to transmit collected information. In some embodiments, an intelligent agent may additionally receive queries and execute them to retrieve data stored in a database deployment. As discussed above, a replica set of a database may comprise a plurality of nodes. In one embodiment, each of the plurality of nodes may have an intelligent agent executing on the node. In one implementation, an intelligent agent running on a respective node can be configured to execute queries and retrieve data from the respective replica set hosted by the node.

In some embodiments, the database monitoring system 110 may include a user interface component 112 configured to generate various interactive user interfaces for displaying information on and accepting information from one or more client devices (e.g., client devices 102, 104, 106). In some embodiments, the user interface component 112 may generate views in a user interface shown on a client device to display information from one or more database deployments associated with a user. The user interface component 112 may accept selection of a database deployment. In one example, the user interface component 112 may generate a list of one or more database deployments on an Internet webpage or mobile application screen. The database deployments may have links associated with them. The user interface component 112 may accept selection of a link associated with a database deployment.

In some embodiments, the user interface component 112 may generate a filterable list of one or more databases and/or collections in a database deployment for navigation. Additionally, the user interface component 112 may generate a view displaying a total number of databases and/or collections in a selected database deployment. The user interface component 112 may further accept selection of a collection of a database and then generate views that visualize information about the collection. For example, the user interface component 112 may generate a webpage(s) or mobile application screen displaying a filterable list of one or more databases and/or collections. The user interface component 112 may accept selection of a database and/or collection and generate additional views displaying more information about the selected entity.

In some embodiments, the user interface component 112 may generate views displaying visualizations of information about one or more collections of a database on the client device. Additionally, the user interface component 112 may further accept selection of a specific collection to generate additional views of information about the selected collection. In one implementation, the user interface component 112 may generate a view of a user interface in which information about a selected collection is displayed in a header of the view. For example, the user interface component 112 may generate, for a selected collection, views (e.g., on a webpage, or a mobile application screen) that display a total size of indexes for a collection, number of indexes for the collection, size of the collection, number of documents stored in the collection, and other information about the collection.

In some embodiments, the user interface component 112 may further generate an index view that displays information about one or more indexes of a collection. For example, the user interface component 112 may generate views that display a size of one or more indexes, keys the indexes are on, rate of accesses of the indexes, and/or attributes of the indexes such as hashing or other constraints. In some implementations, the user interface component 112 may generate graphs, diagrams, and other forms of visualizations to display information.

In some embodiments, the user interface component 112 may generate views displaying real time information (e.g., performance information) about a database deployment. The user interface component 112 may generate visualizations of data about the database deployment that are constantly updated with information retrieved from the deployments. The user interface component 112 may, in one implementation, generate graphs displaying one or more of disk usage, network connection statuses, input/output operations per second (IOPS), and/or number of database operations (e.g., query, getMore, update, insert, delete, etc.). Additionally, the user interface component 112 may display visualizations of the hottest collections, i.e., collections with the most operations. The user interface component 112 may also generate a display showing the slowest operation in a database deployment. In some embodiments, the user interface component 112 may additionally or alternatively generate tables displaying various statistics of a database deployment. The fields may include, for example:

memory statistics
number of bytes in and out of connections in the deployment
number of specified commands, queries, and other data-based operations
number of active readers, active writers, queued readers, and queued writers In some embodiments, the user interface component 112 may generate one or more views displaying a status of hardware of the one or more servers of the database deployment. The user interface component 112 may, for example, generate visualizations of CPU usage of various processes, disk space usage, disk latency, and disk TOPS.

In some embodiments, the user interface component 112 may generate a query interface. The query interface may comprise one or more user interface views through which the user interface component 112 may accept queries for data in a database and/or collection and then generate displays of the queried data. In some embodiments, query data may comprise one or more pages of data. A page of data may comprise a subset of results from a query. For example, a query in a database of an e-commerce website for all transactions occurring on a particular date may result a plurality of data items (e.g., documents of a non-relational database). The plurality of documents may be divided, for displaying, into sets of pages. In some embodiments, a page size may be configurable.

In some embodiments, the user interface component 112 may display one page of query results at a time. In some embodiments, a page may comprise a batch of query results (e.g., a page comprises ten query results). The user interface component 112 may provide navigation buttons in the query interface that allow a user to navigate through pages of results. In one example, the user interface component 112 may generate the query interface on a webpage or screen of a mobile application. The query interface may include an area for a user to enter and submit a query. The query interface may further include an area displaying a page of retrieved query results. The query interface may further include forward and back arrows allowing a user to navigate through the query results.

In some embodiments, the database monitoring system 110 may include an integration component 114 configured to integrate a user interface shown on the client device with a database deployment. In some embodiments, the integration component 114 may establish a communication link between a client device 102, 104, 106 and one or more database deployments 132, 134, 142, 144. In one implementation, the integration component 114 may connect the client device to one or more servers of the database deployment via the network 120 (e.g., the Internet). In some embodiments, the integration component 114 may further retrieve information from the database deployments via the communication link. The information may, for example, be utilized by user interface component 112 to display information in views described above within a display of client devices 102, 104, 106.

In some embodiments, the integration component 114 may connect the client device to an intelligent agent(s) executing on a server(s) of a database deployment. The intelligent agent(s) can be configured, as discussed above, to retrieve monitoring information about the database deployment and also execute queries. The integration component 114 may retrieve information about the database from the intelligent agents and submit queries to the intelligent agents for execution.

In some embodiments, the integration component 114 may receive an identity of a user and/or client device requesting access to the database monitoring system 110. For example, the integration component 114 may receive a username and password of a user and/or an identification associated with a client device (e.g. an IP address). The integration component 114 may determine, according to the identity, database deployments associated with the user and/or client device.

In some embodiments, the database deployments 132, 134, 142, 144 may be organized into a plurality of groups 130, 140. Each database deployment may be categorized into one of the groups. A particular user and/or client device may be associated with a particular group. The user and/or client device may only have access to the database deployments in a group(s) associated with the user and/or client device. For example, users and/or client devices 102, 104 may be associated with database deployments 132, 134 in group 130 whereas user 106 may be associated with database deployments in 142, 144 in group 140. The integration component 114 may limit access of users and/or client devices to only database deployments to which the users and/or client devices are associated. For example, a user may log in to a webpage or mobile application from a client device to access a database deployment. The integration component 114 may then provide access to database deployments in a group to which the user and/or the client device has been given permission to access. The user interface component 112 may, for example, generate a user interface view showing only database deployments in the group. The user may then only access information and data from one of the available database deployments.

In some embodiments, a database deployment group may maintain a list of approved users and/or client devices. The list, for example, include usernames and client device IP addresses that are approved to access the database deployment group. In some embodiments, the integration component 114 may access the list in order to determine whether a user and/or client device has access to the database deployment group.

In some embodiments, the integration component 114 may further transmit queries received from a client device (e.g., queries accepted by user interface component 112 via a query interface) to one or more servers of a database deployment. In some embodiments, the integration component 114 may transmit the query to an intelligent agent of the database deployment for execution. The integration component 114 may retrieve via the communication link, in response to transmitting the queries and execution by the intelligent agent, data items from one or more databases of the database deployment. The data items may then be displayed to a user of the client device as discussed above. In one example, the integration component 114 may transmit a query to an intelligent agent(s) executing on a server(s) of a database deployment. The intelligent agent may execute the query to gather query results. The integration component 114 may then retrieve the data for displaying on a client device.

In some embodiments, the integration component 114 may be configured to retrieve query results in pages. As discussed above, a page may comprise a batch of query results. A page may have a configurable size. For example, in the case of a non-relational database a page may comprise of a set number of documents of a plurality of documents retrieved as a result of executing a query. In one embodiment, the integration component 114 may retrieve a specific number of pages of a query result. The integration component 114 may retrieve successive pages of query results as a user navigates through the results. For example, the integration component 114 may retrieve two pages of a query results at a time. In this example, if the page size is ten documents the integration component 114 may retrieve twenty documents. The user interface component 112 may generate a query results view displaying a first page (e.g., first set of ten documents). The user interface component 114 may display a second page (e.g., second set of ten document) in response to accepting an input indicating a request to view the next page of results. The integration component 114 may further retrieve the next page of results (e.g., third set of ten documents) in response to accepting the input. In some embodiments, the integration component 114 may limit the total number of pages that can be retrieved for a query.

In some embodiments, a database deployment may comprise a plurality of servers. In some embodiments, the integration component 114 may be configured to establish a communication link with the plurality of servers. This may provide redundancy in information and data access for client devices 102, 104, 106. In one implementation, the integration component 114 may be configured to retrieve data from a first server. The integration component 114 may be further configured to retrieve data from a second server if it detects that the first server is unavailable. For example, the first server may be shutdown, restarting, executing balancing activities, and/or other processes. The integration component 114 may retrieve information from the second server during such processes. This redundancy may provide a high level of availability of information for users accessing database deployments.

In some embodiments, the integration component 114 may enter a zero state while the database monitoring system initially connects to a database deployment (e.g., one of database deployment 132, 134, 142, 144). In one implementation, during the zero state the integration component 114 may set up a connection to one or more servers of a database deployment. In some embodiments, the integration component 114 may set up a connection to one or more intelligent agents of the database deployment. Additionally, the integration component 114 may retrieve an initial list of databases and collections stored in the database deployment from the intelligent agent(s).

In some embodiments, the integration component 114 may support user concurrency in the database monitoring system. The integration component 114 may integrate user interfaces of multiple client devices to the same database deployment. In one implementation, the integration component 114 connects each user of the multiple users using one or more addresses (e.g. domain name system (DNS) addresses) unique to the user. In some embodiments, the integration component 114 may allow each user to connect to a plurality of servers. For each user, the integration component 114 may connect the user to each of the plurality of servers using a different address. The integration component 114 may manage connections from a plurality of users to a plurality of servers using the individual addresses. For example, the integration component 114 may direct information requested by a first client device from a first server using an address associated with the user and the first server. The integration component 114 may direct information for a second client device from the first server using an address associated with a connection between the second client device and the server.

In some embodiments, the database monitoring system 110 may include a data cache component 116. The data cache component 116 may temporarily store information retrieved from a database deployment in order to provide quick and efficient access to the information for reuse. In some embodiments, the data cache component 116 may store all retrieved information on a client device. In one implementation, the data cache component 116 may store information on the client device for a duration of the connection to a database deployment. If a user navigates away from or commands a disconnect, the data cache component 116 may clear the stored information. For example, a user accessing the database monitoring system 110 via client device 102 may access database deployment 132. The user may, for example, log into a website or mobile application and select the database deployment to initiate a connection session. The data cache component 116 may store all retrieved information during the session on the client device 102. The user may log off or select to disconnect from the database deployment 132. The data cache component 116 may, in response, clear the stored retrieved information from the client device.

In some embodiments, the data cache component 116 may store query results retrieved from the database deployment. In one implementation, the data cache component 116 may store data retrieved from one or more queries for a time period after initially retrieving the data. The data cache component 116 may refresh the retrieved data if a user re-navigates to queried data after expiration of the time period. If, however, the user navigates to the queried data prior to the time period, the data can be accessed from the data cache on the client device. For example, a user may query a collection in a database deployment 132 from client device 102. The data cache component 116 may store the queried data on the client device 102. The user may then navigate away from the queried data. If the user re-navigates to the queried data within a time period of the initial query, the database monitoring system 110 may redisplay the data stored by the data cache component 116. If, however, the user re-navigates to the queried data after time period, the database monitoring system 110 may retransmit the query and re-retrieve the query data.

In some embodiments, requests from the database monitoring system 110 (e.g., received from a user interface shown on a client device) to a database deployment 132, 134, 142, 144 may be performed with a timeout. In some embodiments, the timeout may be configurable. In some embodiments, the integration component 114 may have a first timeout for communication to a database deployment and a second timeout for execution of an operation by a server(s) of the database deployment. In some embodiments, the user interface component 112 may generate error views on a user interface shown in a display of a client device indicating expiration of a timeout. In some embodiments, the database monitoring system 110 may automatically retry a request in the case of a timeout.

In some embodiments, the database monitoring system may further include an access manager 118. The access manager 118 may protect a database deployment from unauthorized access via database monitoring system 110. In some embodiments, the access manager 118 may govern access according to various types of roles with associated permissions to govern access to information retrieved by the database monitoring system 110. In some embodiments, the access manager 118 may limit access to particular views generated by the user interface component 112 according to permissions associated with a role of a user. For example, the role manager may recognize an administrative role assigned to a user. The administrative role may, for example, be assigned to a database deployment group owner(s). The role may be required by a user in order to view certain information. In one embodiment, the user interface component 112 may generate an error message on a user interface screen of a client device if an unauthorized user attempts to access information for which the user does not have permission. In some embodiments, the access manager 118 may further provide a global on/off switch to disable access to information to all users. A group owner, for example, may control the global on/off switch in order to limit access to a database deployment (e.g., for maintenance activities).

Figure 2:
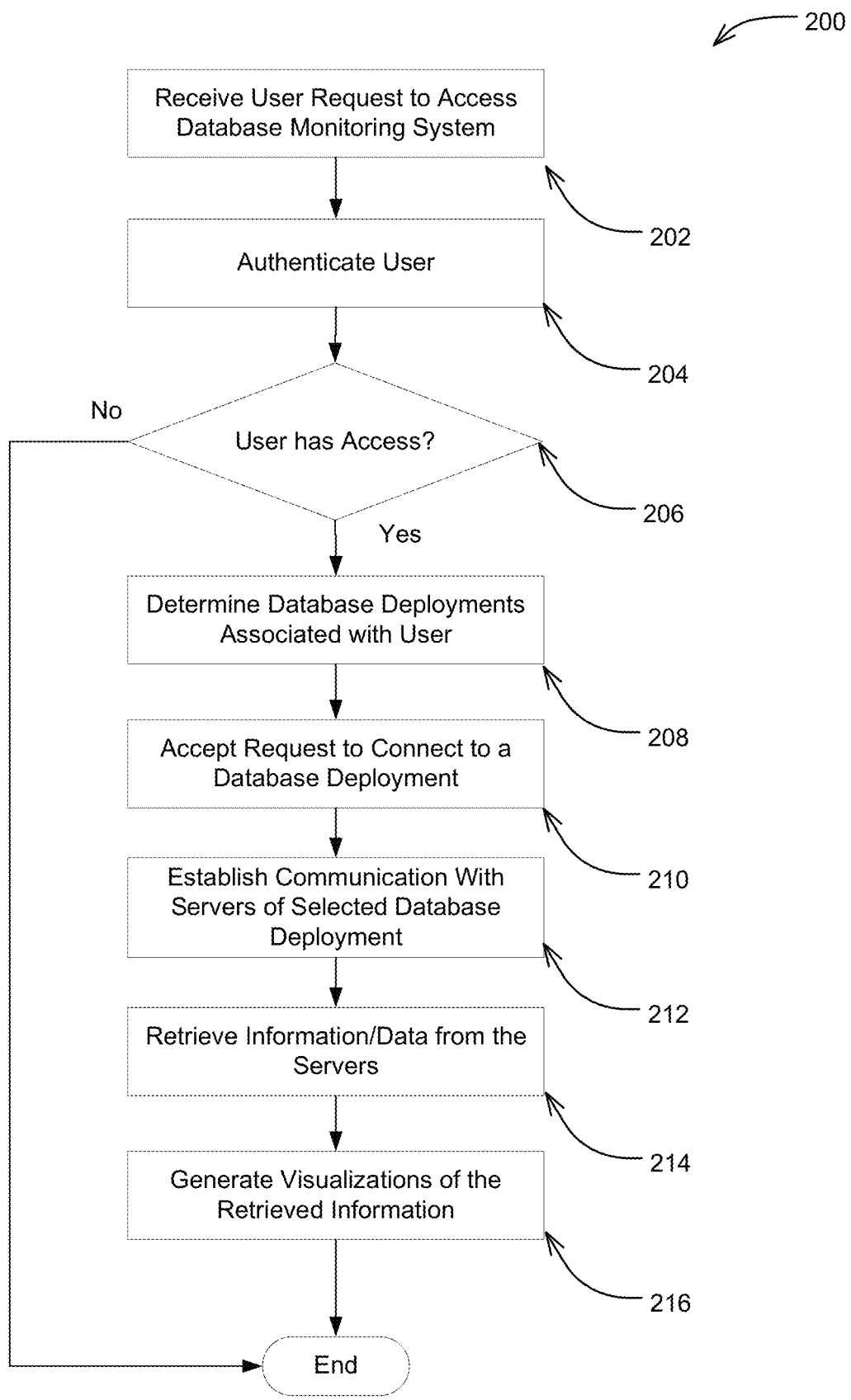
FIG. 2 shows a process flow diagram of integrating a client device with a database deployment, according to one embodiment.

FIG. 2 shows an example process 200 for integrating a user interface shown on a client device (e.g. one of client devices 102, 104, 106) to a database deployment (e.g., one of database deployments 132, 134, 142, 144). Example process 200 may, for example, be executed by database monitoring system 110 described above with respect to FIG. 1.

Process 200 begins at act 202 where the database monitoring system 110 may receive a request to access the database monitoring system 110 from a client device. For example, a user may log into a website via an Internet browser application executing on the client device or log into a mobile application from the client device. The user may, for example, enter a username and password to enter the system and request access to one or more services.

Next, process 200 proceeds to act 204 where the user is authenticated. The database monitoring system 110 may, for example, receive a username and/or password from the client device and authenticate the username and/or password to verify that the user has permission to access database monitoring system 110. In some embodiments, the database monitoring system 110 may additionally or alternatively also check a unique identity of the client device from which the request was received. For example, the database monitoring system 110 may verify that an IP address of the client device has permission to access the database monitoring system 110.

Next, process 200 proceeds to act 206 where the database monitoring system 110 determines whether the user and/or client device have access to the database monitoring system 110. If, during authentication, it is found that the user and/or client device do not have sufficient permission(s) 206 NO then process 200 ends. The database monitoring system 110 may, for example, direct the client device to a webpage or screen of a mobile application displaying an error message or a message indicating that the user does not have access.

If, however, the user and/or client device are found to have access during authentication 206 YES process 200 proceeds to act 208. Act 208, the database monitoring system 110 determines database deployments that are associated with the user. In some embodiments, the database deployments may be organized into groups and users may be granted access to the database deployments according to users' associations with groups. As shown in FIG. 1, for example, database deployments 132 and 134 may be configured under group 130. A user and/or client device 102 may be associated with group 130. For example, database deployments 132 and 134 may be associated with a particular application, website, company, or other entity that uses database deployments 132 and 134 and the user and/or client device 102 may be a database administrator, developer, or other user who may need to access database deployments 132 and 134 for various activities (e.g., data verification, monitoring, maintenance). In this example, the database monitoring system 110 may determine that the user and/or client device 102 is associated with group 130. In one embodiment, the database monitoring system 110 may access a configuration server to determine association of the user and/or client device to particular groups.

In some embodiments, the database monitoring system 110 may generate a view in a user interface displayed on the client device showing one or more database deployments to which the user has access. For example, for a user and/or client device 102 associated with group 130 accessing the database monitoring system 110 via an Internet browser application or mobile application, the database monitoring system 110 may generate a view showing a list of database deployments 132, 134 in group 130. Each database deployment may, for example, have a link associated with it that a user may select in order to request further access to the specific database deployment.

Next, process 200 proceeds to act 210 where the database monitoring system 110 may accept a request to connect to a particular database deployment. In one embodiment, the database monitoring system 110 may receive selection of a database deployment from a user interface view shown in a display of the client device. For example, the database monitoring system 110 may accept a selection of a link associated with the database deployment from an Internet webpage or accept selection of a button associated with the database deployment from a mobile application.

Next, process 200 proceeds to act 212 where the database monitoring system 110 may establish a communication link with the selected database deployment over a network (e.g., network 120 discussed with reference to FIG. 1). In some embodiments, the database monitoring system 110 may establish a communication link between the client device and the database deployment. In some embodiments, establishing the communication link may connect a user interface executing on the client device to the database deployment. In one implementation, the database deployment may comprise a cluster of one or more servers hosting one or more databases, and the database monitoring system 110 may establish a connection to one or more intelligent agents running on the servers. In one example, the servers of the cluster may be configured to host a non-relational database (e.g., MongoDB non-relational database). The cluster may further store metadata (e.g., performance data, memory data, disk space usage data), configuration settings, and other information for the cluster.

In some embodiments, by establishing a communication link between a client device or user interface of a client device to the database deployment, the database monitoring system integrates a user interface with the database deployment. The database monitoring system 110 may establish the communication without use of a particular database application, tool, or other interface. For example, a user may, in order to access the database deployment, access an Internet website via an Internet browser application running on a client device (e.g., a computer, mobile device). The database monitoring system 110 may establish a link from a user interface running on the client device to the database deployment using a network (e.g., the Internet) upon accepting a request to connect (e.g., selection of a link on a webpage). A user may access information from and interact with the database deployment via the user interface.

Next, process 200 proceeds to act 214 where the database monitoring system 110 retrieves information from the servers. In some embodiments, cluster servers may have intelligent agents executing on the servers. The intelligent agents may be configured to collect information about the cluster and transmit the data. The database monitoring system 110 may communicate with the intelligent agents to retrieve information. In some embodiments, the database monitoring system 110 may retrieve information in real time once connected to a database deployment. The information may then be used to generate visualizations of real time performance and statistics of the database deployment within a user interface displayed on the client device. For example, the system 110 may generate visualizations in various views of an Internet website through which accesses the database deployment.

In some embodiments, the database monitoring system 110 may also retrieve data stored in databases and/or collections stored in the database deployment. In some embodiments, the database monitoring system 110 may accept queries for data stored in a database or collection (e.g., via user interface shown in display of client device). In one implementation, the database monitoring system 110 transmits queries to servers of the database deployment. The servers may execute the queries and transmit data back to the database monitoring system 110. For example, the database monitoring system 110 may transmit queries to intelligent agents executing on the servers. The intelligent agents may process the queries to gather data and transmit it to the client device via the established connection for displaying in a view of a user interface (e.g., website) shown on the client device.

The inventors have appreciated that the database monitoring system 110 may provide monitoring services to a large number of users accessing a large number of database deployments. Thus, the database monitoring system 110 must respond to requests for data and information from many users. In some embodiments, the database monitoring system 110 may only retrieve information in real time when a user requests access to a database deployment. This may limit the amount of data that must be retrieved by the database monitoring system 110 and transmitted by database deployments. This may further limit the computations required by database deployment servers in order to gather information.

Figure 4:
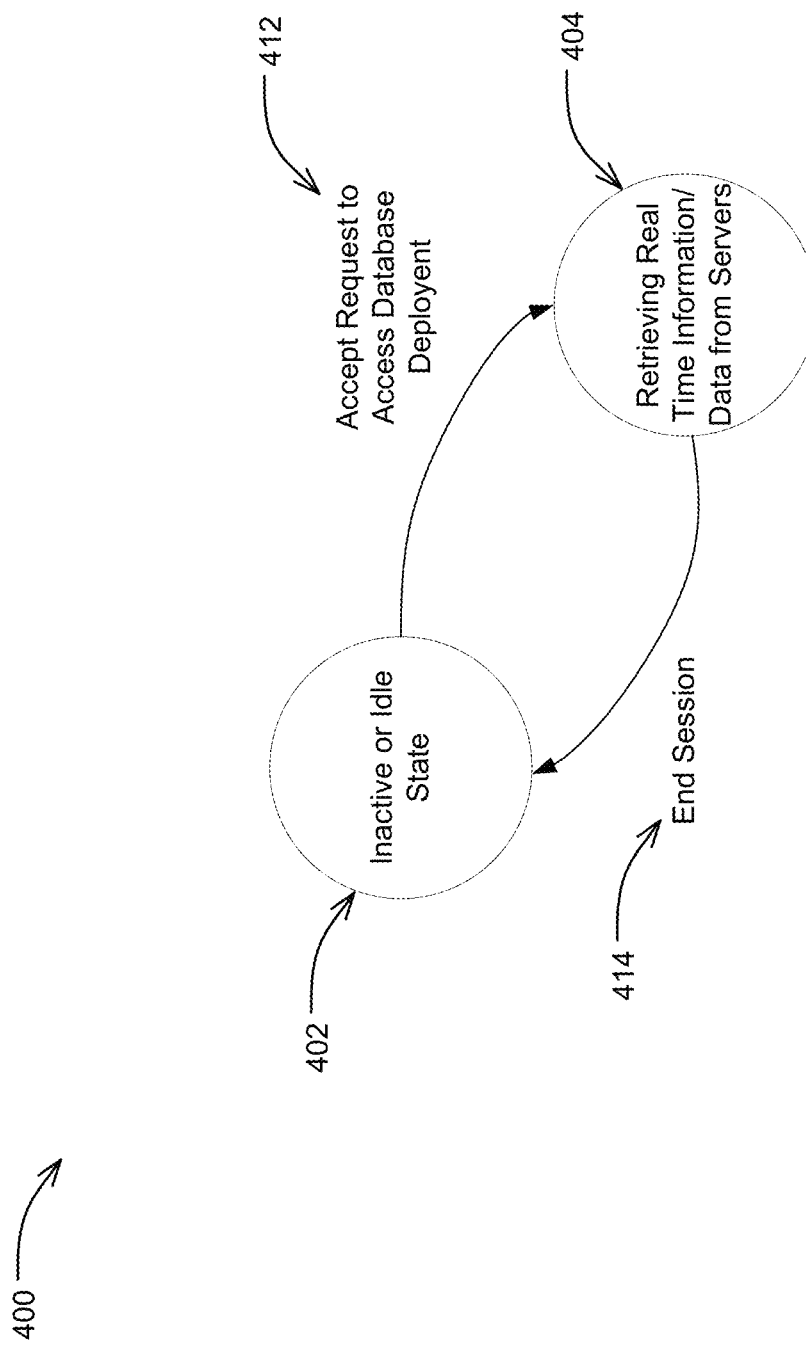
FIG. 4 shows a state transition diagram of a database monitoring system, according to one embodiment.

FIG. 4 illustrates an example state diagram that illustrates example states and transitions that the database monitoring system 110 may undergo in accordance with some embodiments. In the inactive or idle state 402, the database monitoring system 110 may not have a communication link established between a client device and a database deployment. In this state, the database monitoring system 110 may not be retrieving any information or data from the database deployment and the database deployment may not be transmitting any information or data to the client device. The database monitoring system 110 may then accept a request to access the database deployment 412 (e.g. during process 200) and enter state 404 in which the system 110 is retrieving information in real time from servers of the database deployment. The active state 404 may comprise a state during which a user is accessing the database monitoring system 110 in order to execute various tasks (e.g., monitor data, verify data, view performance of deployment). The database monitoring system may then receive an indication that a user's interaction session has ended 414 and transition back to the inactive or idle state 402. The database monitoring system 110 may, for example, receive a user request to exit from a user interface screen or determine that the user has logged off.

Information collection and transmission operations may need to be executed primarily when accessed or requested by users. According to some embodiments, by limiting information retrieval to execute when access to the information is requested by a user or device, the database monitoring system 110 limits computation associated with querying data from a database and computations associated with information transfer between database deployments and client systems as described in reference to FIG. 4 above.

Next, process 200 proceeds to act 216 where the database monitoring system 110 generates visualizations of retrieved information. In some embodiments, the database monitoring system 110 may generate multiple views of a user interface displayed on a client device. For example, a user accessing the database monitoring system 110 via an Internet browser application may be able to view several visualizations of real time performance information about a database deployment and data stored in collections of a database on various webpages of an Internet website screens of a mobile application. In one implementation, the database monitoring component 110 may generate a user interface via which a user can navigate to various information. Further, the user interface may provide a filterable list of databases and/or collections that a user may select from for information about the database or collection. The user interface may further provide an interface via which a user may request to view data stored in databases of the database deployment (e.g., submit queries for data).

Figure 9:
FIG. 9 shows an example user interface view displaying visualizations of retrieved information according to one embodiment.

FIG. 9 illustrates an example embodiment of a user interface view 900 displaying real time information collected about a database deployment (e.g., from cluster servers). The user interface may include visualizations of data collected in real time by database monitoring system 110. View component 902 illustrates example visualizations of various types of information about a deployment 901 (i.e., Cluster0). The visualizations display various statistics about the database deployment such as memory usage, network communication, and operations executed per second. The database monitoring system 110 may collect this information in real time and update the visualizations with updated data. The user interface 900 may further include a pause/play button 904 in order to pause or resume updates to visualizations based on real time collected data from the database deployment.

Figure 10:
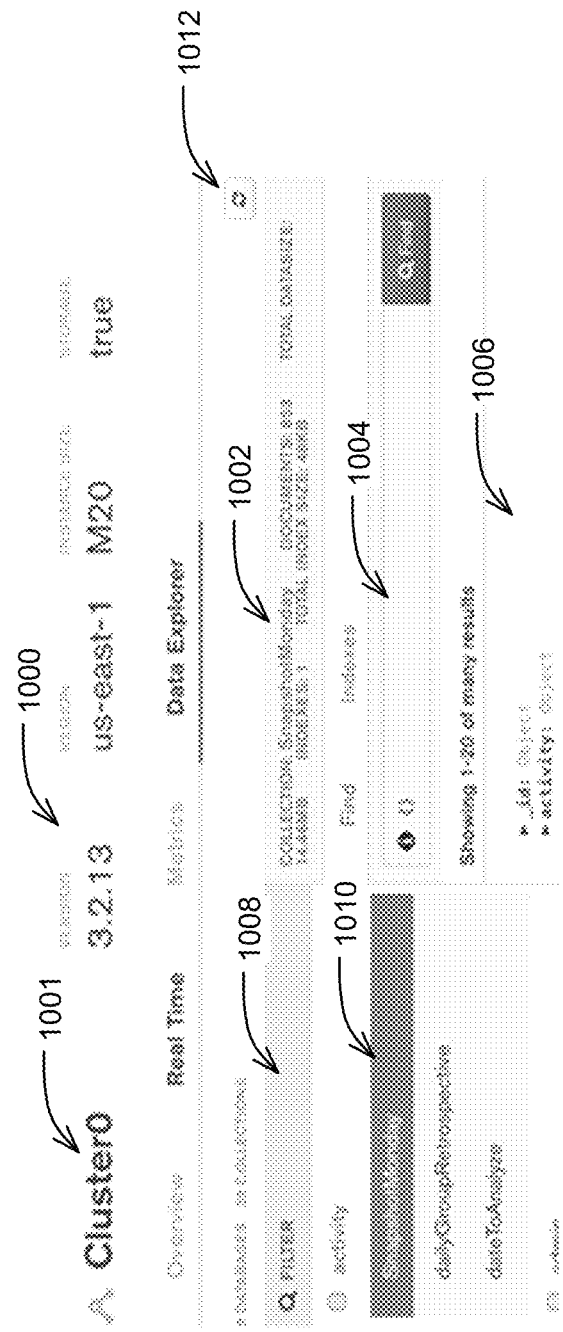
FIG. 10 shows an example user interface view to explore one or more databases according to one embodiment.

FIG. 10 illustrates an example embodiment of a user interface 1000 generated by the database monitoring system 110 that allows users to navigate databases and/or collections stored on a database deployment 1001 (i.e., Cluster0). The user interface 1000 further includes a query interface 1004 and query result display view 1006. A user may search for collections and/or databases and further select specific collections. In example user interface 1000, a user has selected the database collection 'SnapshotMonday' 1010 from the 'activity' database. The database monitoring system 110 may display information about the selected collection in a header 1002 of the user interface 1000. The user interface further includes a search bar 1008 via which a user may search for particular databases and/or collections.

Continuing reference to FIG. 10, user interface 1000 further includes a query input component 1004 through which the database monitoring system 110 may accept user entered queries and transmit them to a database deployment. A user may, for example, enter a query in the query input 1004. The database monitoring system 110 may then retrieve data specified by the query. The database monitoring system 110 may further generate a display of the query results 1006. The query results may include several pages. The database monitoring system 110 may provide a user interface having navigation buttons for a user to navigate through query results. In one implementation, the user interface 1000 may include forward and back buttons via which a user may navigate through query results (e.g., pages of query results). In some embodiments, the database monitoring system 110 may also provide a refresh button 1012 in the user interface. The database monitoring system 110 may accept a request from the user to refresh data and, in response, re-execute a query.

Figure 3:
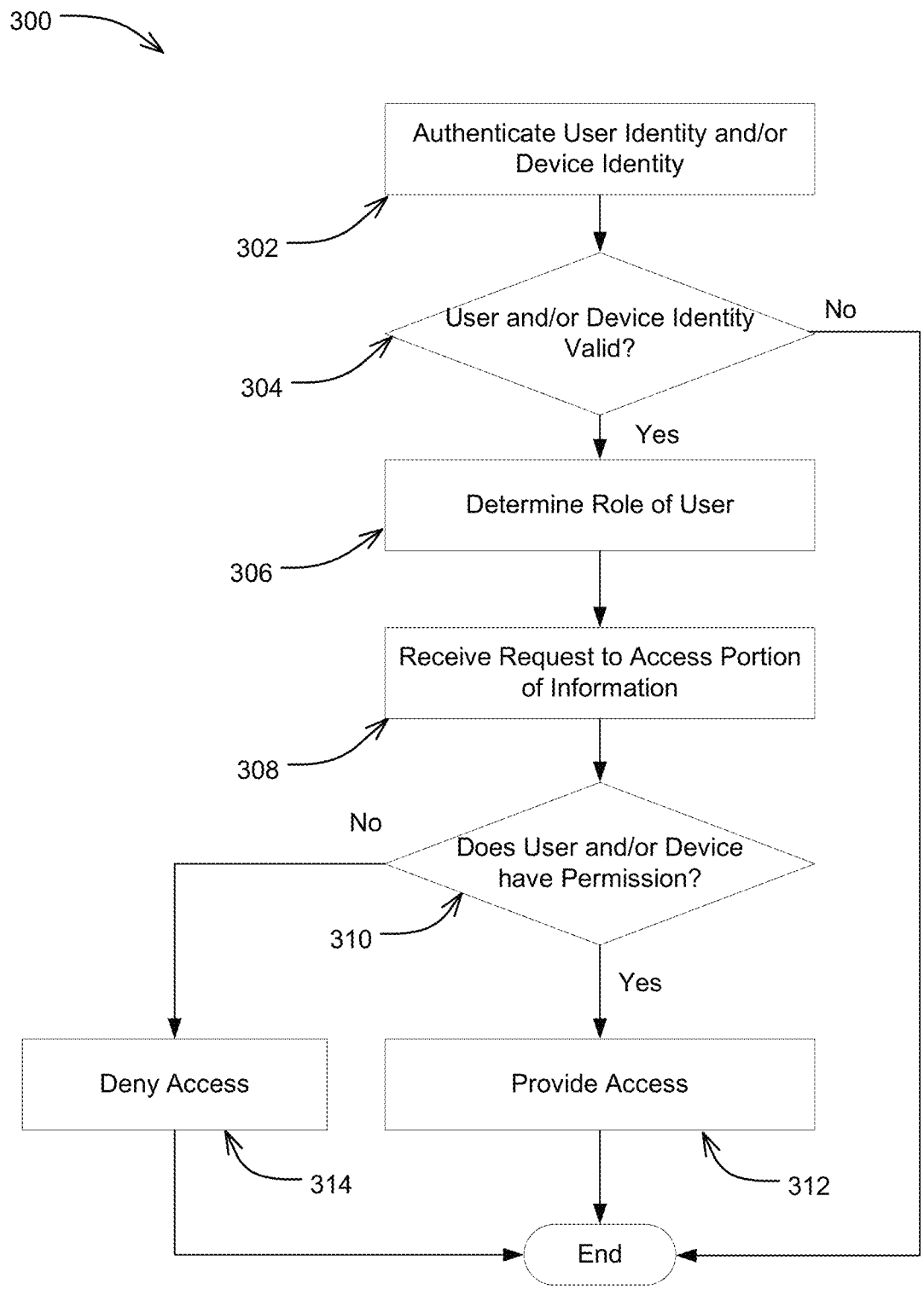
FIG. 3 shows a process flow diagram of managing user access to information according to one embodiment.

In some embodiments, the database monitoring system 110 may manage access to various portions of information retrieved by the system. FIG. 3 illustrates an example process 300 by which the database monitoring system 110 may manage access of a user to information accessible by the database monitoring system 110.

Process 300 begins at act 300, the database monitoring system 110 may authenticate an identity of a user and/or client device accessing the database monitoring system 110. The authentication may, for example, be part of authentication executed during process 200 discussed above with reference to FIG. 2. The database monitoring system 110 may determine whether a particular user identity (e.g., username and password) has permission to access database deployments via the database monitoring system 110. Additionally or alternatively, the database monitoring system 110 may determine whether a client device has access to the database monitoring system 110. The system may, for example, limit access to particular client devices by a device IP address. In some embodiments the database monitoring system 110 may store authentication information from which it can authenticate users and/or devices. In other embodiments, the database monitoring system 110 may access other systems to authenticate users and/or devices. Embodiments of the present invention are not limited in this respect.

Next, process 300 proceeds to act 304 where the database monitoring system 110 determines whether a user and/or device identity are valid (e.g., have permission to access the system). If not 304 NO, the process 300 ends and the user and device are not given any further access. If the user and/or device identity are valid 304 YES, the database monitoring system 110 proceeds to act 306 where the system determines a role of the user.

At act 306 of process 300, the database monitoring system 110 determines one or more roles associated with a user and/or device. In some embodiments, the database monitoring system 110 may access the database deployment group to determine the roles.

In some embodiments, a database deployment group may maintain a plurality of roles for various users and/or devices for a given database deployment. Each role may have different levels of access to information associated with it. A user and/or device may be assigned one or more roles. The assigned roles may govern access of a particular user and/or device. In one example, a database deployment may have a group owner role. The group owner role may, for example, provide permission to access data stored in a database deployment. In one example, a database deployment may comprise a MongoDB Atlas cluster deployment. Data stored in the cluster deployment may be viewed via the MongoDB Data Explorer portion of a user interface generated by database monitoring system 110. The database monitoring system 110 may govern access to the MongoDB Data Explorer based on role(s) associated with a user and/or device.

Next, process 300 proceeds to act 308 where a user may request access to a portion of information retrieved by the database monitoring system 110. In one implementation, the database monitoring system may receive a request to access to a particular view or section of a user interface generated by the system and displayed on a client device of the user (e.g., Data Explorer of the MongoDB Atlas UI). At act 310 of process 300, the database monitoring system may determine whether the user and/or device has permission to access the requested information. In one embodiment, the database monitoring system 110 may determine whether the user and/or device have a role that has permission to access to the requested information (e.g., user interface view). If the user and/or device has one or more required roles 310 YES, the database monitoring system 110 may provide access to the user and/or device at act 312. If, however, the user and/or device does not have a required role 310 NO, process 300 proceeds to act 314 where the database monitoring system 110 denies access to the requested information. The database monitoring system 110 may, for example, generate a message or screen of a user interface indicating an error or message informing a user that access is denied.

In one example, a user may have accessed a MongoDB cluster deployment via the database monitoring system 110. The user may then request access to Data Explorer from a user interface generated by the databased monitoring system 110 displayed on a client device. The user may, in this example, not have a specific role required to access Data Explorer (e.g., a group owner role). In this case, the database monitoring system 110 may deny the user access to the Data Explorer. The system 110 may generate a message to display in the user interface indicating to the user that the user does not have appropriate permission(s). In another example, the user may have a role needed to access the Data Explorer (e.g., a group owner role). In this case, the database monitoring system 110 may allow the user to access Data Explorer.

Figure 5:
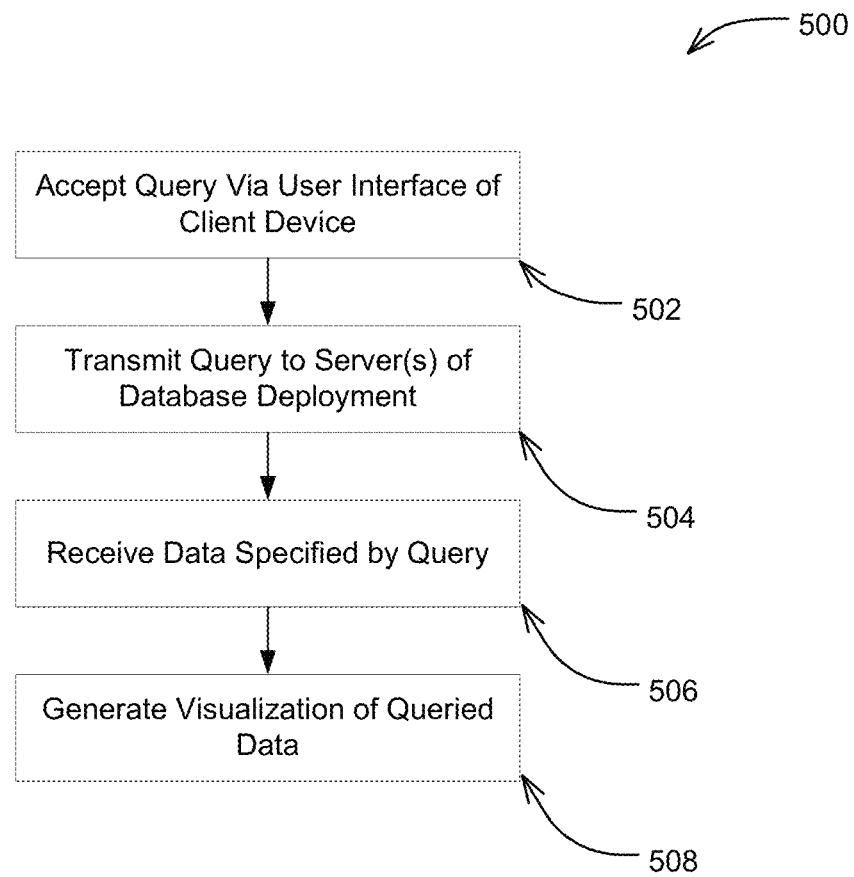
FIG. 5 shows a process flow diagram of processing a query according to one embodiment.

In some embodiments, the database monitoring system 110 may accept requests for data (e.g., queries) stored in a database(s) of a database deployment and respond to requests received from a client device as discussed above. FIG. 5 illustrates an example process by which the database monitoring system 110 may respond to a query.

Process 500 begins at act 502 where the database monitoring system 110 accepts a query interface shown in a display of a client device. The query interface may, for example, comprise the query interface shown and discussed above in reference to FIG. 10. A user may enter a query and then submit to the database monitoring system 110 (e.g., by clicking a button).

Next, process 500 proceeds to act 504 where the database monitoring system 110 transmits the query to one or more servers of a database deployment. The database deployment may, for example, comprise a database deployment with which the database monitoring system 110 established connection during process 200 discussed above. In some embodiments, the database monitoring system 110 may transmit the query to intelligent agents executing on the one or more servers. One or more servers may execute the query and then transmit the resulting data to the client device (e.g., via a communication established by system 110 during process 200).

Next, process 500 proceeds to act 506 where the database monitoring system 110 receives data from the one or more servers. The database monitoring system 110 may, for example, receive one or more data items that were retrieved by a server(s) as a result of executing the query. In one example, the database deployment may be hosting a non-relational database. The data items may, in this example, comprise documents from the database.

Next, process 500 proceeds to act 508 where the database monitoring system 110 generates visualizations of the queried data. In some embodiments, the database monitoring system 110 may generate visualizations of the retrieved data within a user interface displayed on a client device from which the query was submitted. In one implementation, the database monitoring system 110 may display one page of retrieved data (e.g., a set of results from the query) at a time. The database monitoring system 110 may further provide navigation options in the user interface (e.g., forward and backward buttons) that allow a user to navigate query results. For example, the database monitoring system 110 may fetch different pages of the retrieved data in response to receiving forward and backward selections from the user interface (e.g., by selection of the buttons).

Figure 6:
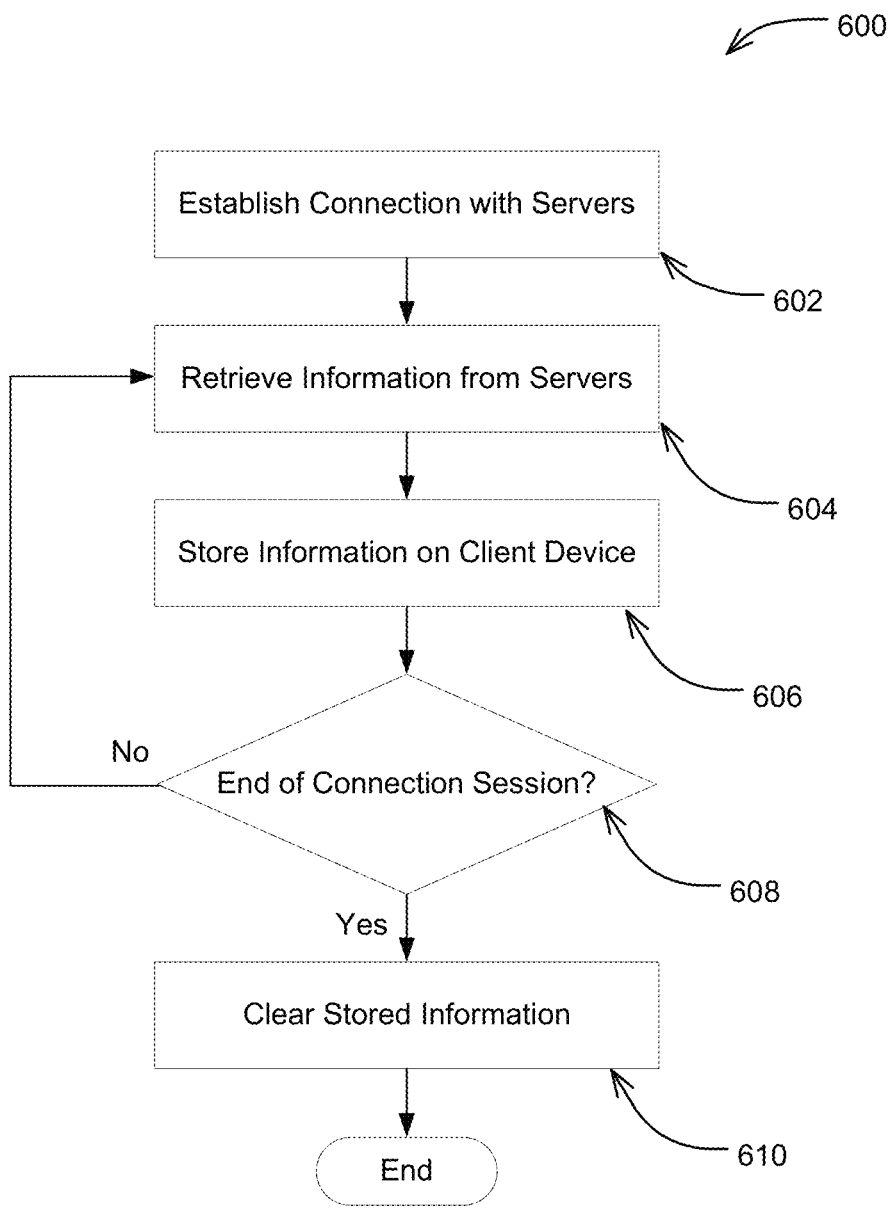
FIG. 6 shows a process flow diagram for temporarily storing retrieved information according to one embodiment.

In some embodiments, the database monitoring system 110 may store information retrieved from one or more servers of a database deployment on a client device accessing the database monitoring system 110. In some embodiments, the database monitoring system 110 stores the retrieved information in a temporary data cache. FIG. 6 illustrates an example process by which the database monitoring system 110 may store retrieved information in a temporary data cache.

Process 600 begins at act 602 where database monitoring system 110 establishes a connection with one or more servers of a database deployment (e.g., during process 200) in response to a request received from a client device. After establishing a communication link with the one or more servers, process 600 proceeds to act 604 where the database monitoring system 604 retrieves information from the server(s). The retrieved information may comprise meta-information about the database deployment (e.g., metrics, performance, memory usage, network usage, storage, etc.) and/or data retrieved in response to a query(s) retrieved from the client device.

Next, process 600 proceeds to act 606 where the data monitoring system 110 stores retrieved information on the client device. In some embodiments, the data monitoring system 110 stores the retrieved information in a temporary data cache on the client device. The data monitoring system 110 may then quickly access data that has previously been retrieved from the data cache. In some embodiments, accessing data from the data cache may be significantly faster and more efficient than re-retrieving information from a server(s) of a database deployment. Additionally, this may reduce computational burden on database deployment server(s) by avoiding computations associated with collecting and transmitting requested information.

Next, process 600 proceeds to act 608 where the database monitoring system 110 determines whether the connection session with the database deployment server(s) has ended. In some embodiments, the database monitoring system 110 may receive an indication of an end to a connection session via a user interface shown in a client device. For example, the database monitoring system 110 may receive an indication that a user has selected to log off or selected an option to exit from an information monitoring screen. If the database monitoring system detects an end to the connection session 608 YES, the database monitoring system proceeds to act 610 where the system 110 clears the stored information. In some embodiments, the database monitoring system 110 may clear a data cache stored on the client device. If, however, the database monitoring system 110 does not detect an end of the connection session 608 NO, the process returns to act 604 where the database monitoring system 110 continues to retrieve information from the database deployment server(s) and store it on the client device at act 606.

Figure 7:
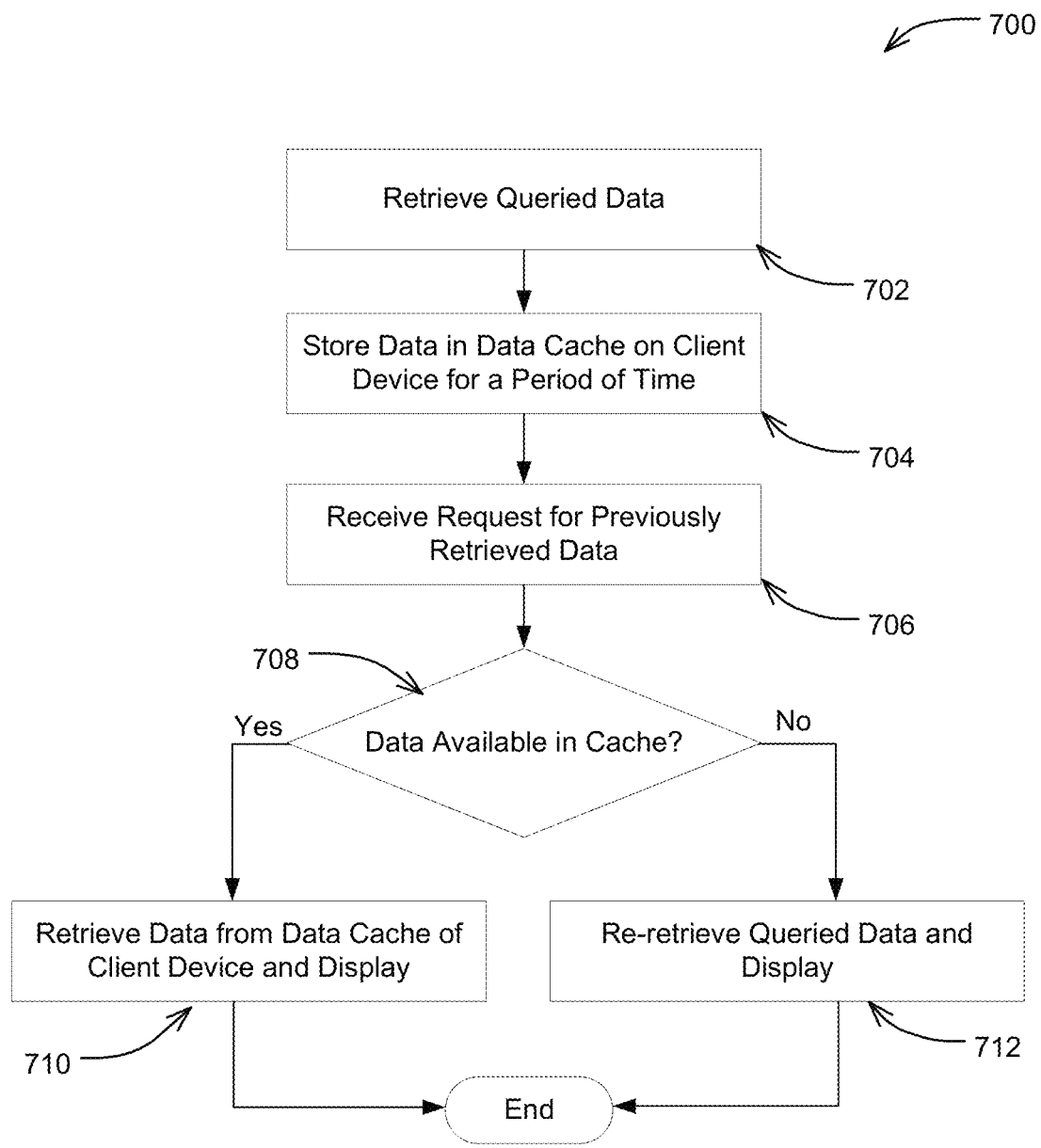
FIG. 7 shows a process flow diagram for temporarily storing retrieved query data according to one embodiment.

In some embodiments, the database monitoring system 110 may store queried data for a period of time in order to ensure that the system 110 is providing the most up to date data from the database. FIG. 7 illustrates an exemplary process 700 by which the database monitoring system 110 may execute temporary storage of query data.

Process 700 begins at act 702 where the database monitoring system 110 retrieves queried data (e.g., during process 500). The system 110 may, for example, have retrieved one or more documents from a collection of a non-relational database. Next, exemplary process 700 proceeds to act 704 where the database monitoring system 110 stores data in a data cache on the client device for a period of time. In some embodiments, the database monitoring system 110 may automatically clear the stored data items from the client device upon expiration of the period of time. In some embodiments, the period of time may be configurable.

Next, process 700 proceeds to act 706 where the database monitoring system 110 receives a request for previously retrieved data. For example, the system 110 may receive a query for data that had been previously retrieved as a result of a previous query. Next process 700 proceeds to act 708 where the system determines whether the data is available in the data cache stored on the client device. In some embodiments, if the data had been retrieved within an amount of time that is less than a temporary storage time limit, the data may still be available in the data cache.

If the data is available in the cache 708 YES, the database monitoring system 110 may retrieve the data from the data cache of the client device and display it. The database monitoring system 110 may, for example, generate a view displaying one or more documents retrieved from a previous query to a non-relational database of a database deployment. If, however, the data is not available in the data cache 708 NO, the database monitoring system 110 may transmit the request (e.g., query) to the database deployment server(s) to retrieve the data. The database monitoring system 110 may then use the newly retrieved data to generate a view in a user interface of the client device displaying the retrieved data (e.g., documents of a non-relational database).

Figure 8:
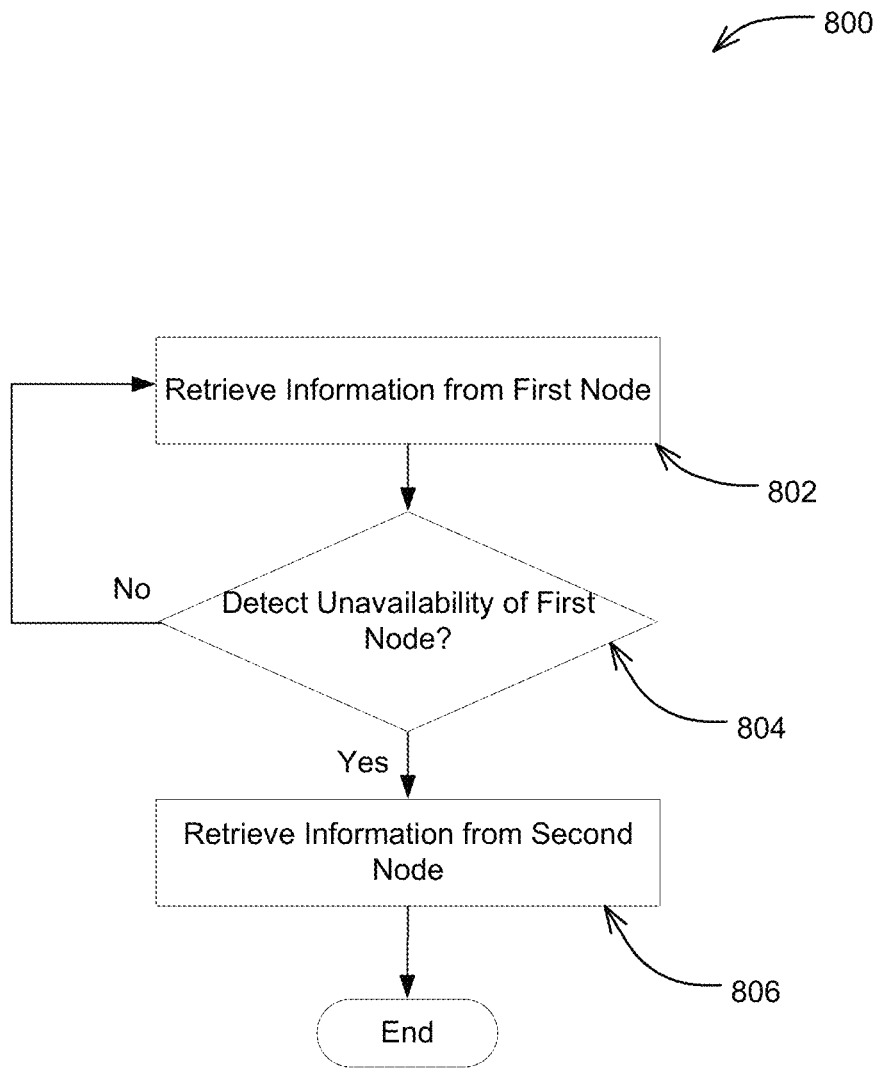
FIG. 8 shows a process flow diagram for using multiple nodes to retrieve data according to one embodiment.

In some embodiments, database deployments may include replica sets of a database as discussed above. Each replica set may comprise a plurality of nodes, each of which hosts a replica of the database. In some embodiments, the database monitoring system 110 may utilize multiple nodes to access data in order to have redundancy of data access and maintain data availability for users accessing database deployments via database monitoring system 110. FIG. 8 illustrates an example process 800 according to which the database monitoring system 110 may use multiple nodes of a replica set to retrieve data.

Process 800 begins at act 802 where the database monitoring system 110 may be configured to retrieve data from a first node of a replica set. The first node may, for example, comprise a primary node or secondary node of the replica set. Any queries for data may, for example, be directed to the first or primary node. In one implementation, the first node may have a first intelligent agent associated with it. The intelligent agent may execute queries and retrieve data from the replica set associated with the first node.

Next, process 800 proceeds to act 804 where the database monitoring system 110 determines whether the first node is unavailable. In one implementation, a node may be unavailable during a process of restarting, shutting down, node rebalancing, or other process. During these processes, it may not be possible to retrieve data from the first node. In some embodiments, the database monitoring system 110 may receive an indication that the first node is unavailable. For example, the system 110 may receive an indication from an intelligent agent of the first node indicating that the first node is unavailable.

If the system 110 receives an indication that the first node is unavailable, 804 YES, process 800 proceeds to act 806 where the database monitoring system 110 may then retrieve information from the second node. For example, queries received by the database monitoring system 110 may be sent to the second node in order to retrieve data. In some embodiments, the second node may comprise another secondary node of the replica set. In one implementation, the second node may have a second intelligent agent running on it. The second intelligent agent may execute queries and retrieve data from the replica set associated with the second node. If, however, the first node is detected as available 804 YES, then the database monitoring system 110 may continue retrieving data from the first node.

The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various systems and components (e.g., database monitoring system, user interface component, integration component, access manager, data cache etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 11:
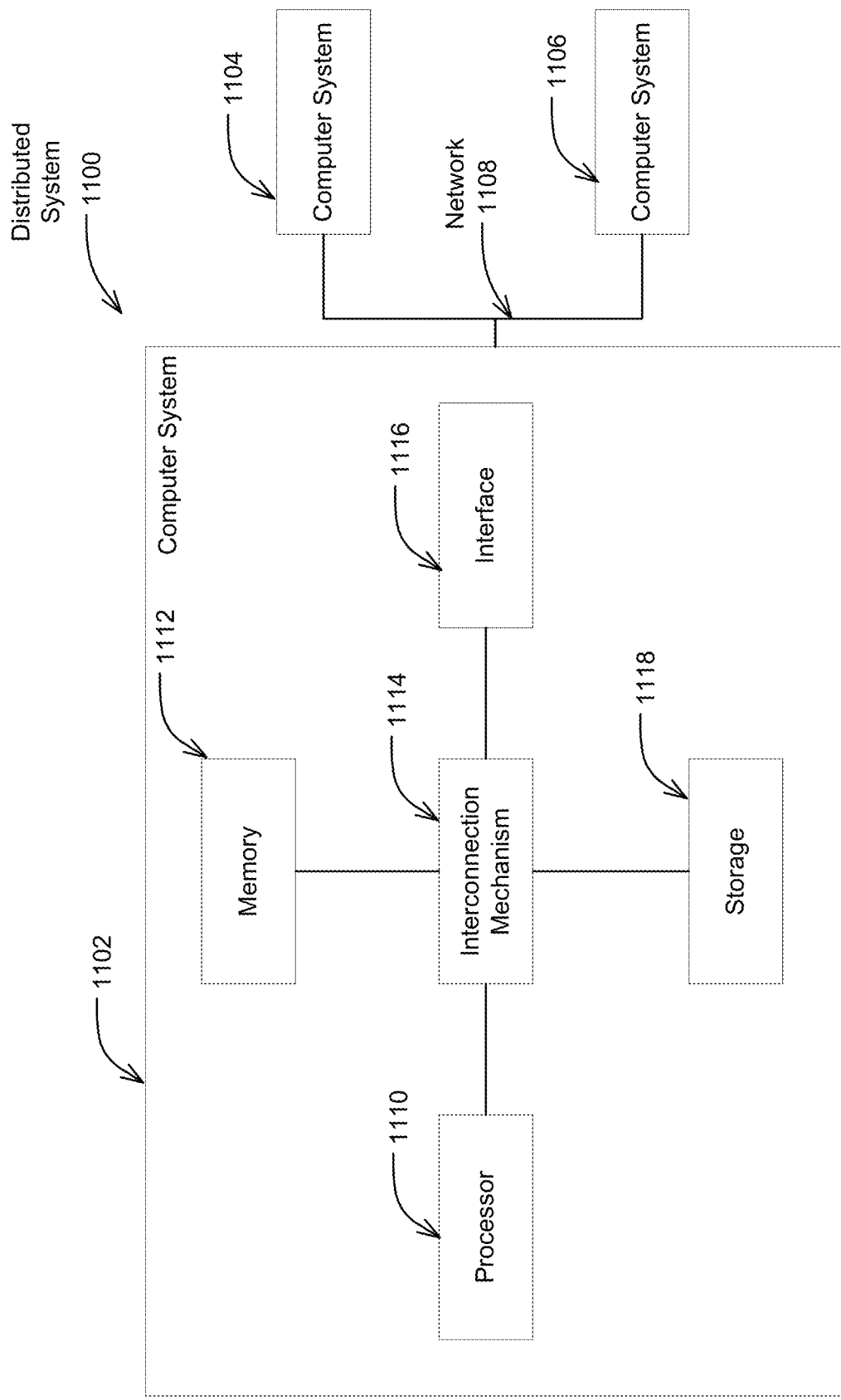
FIG. 11 shows a block diagram of a computer system in which various aspects of the present invention can be practiced.

Referring to FIG. 11, there is illustrated a block diagram of a distributed computer system 1100, in which various aspects and functions are practiced. As shown, the distributed computer system 1100 includes one or more computer systems that exchange information. More specifically, the distributed computer system 1100 includes computer systems 1102, 1104, and 1106. As shown, the computer systems 1102, 1104, and 1106 are interconnected by, and may exchange data through, a communication network 1108. The network 1108 may include any communication network through which computer systems may exchange data. To exchange data using the network 1108, the computer systems 1102, 1104, and 1106 and the network 1108 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 1102, 1104, and 1106 may transmit data via the network 1108 using a variety of security measures including, for example, SSL or VPN technologies. While the distributed computer system 1100 illustrates three networked computer systems, the distributed computer system 1100 is not so limited and may include any number of computer systems and computing devices, networked using any medium and communication protocol.

As illustrated in FIG. 11, the computer system 1102 includes a processor 1110, a memory 1112, an interconnection element 1114, an interface 1116 and data storage element 1118. To implement at least some of the aspects, functions, and processes disclosed herein, the processor 1110 performs a series of instructions that result in manipulated data. The processor 1110 may be any type of processor, multiprocessor or controller. Example processors may include a commercially available processor such as an Intel Xeon, Itanium, Core, Celeron, or Pentium processor; an AMD Opteron processor; an Apple A11 or A5 processor; a Sun UltraSPARC processor; an IBM Power5+ processor; an IBM mainframe chip; or a quantum computer. The processor 1110 is connected to other system components, including one or more memory devices 1112, by the interconnection element 1114.

The memory 1112 stores programs (e.g., sequences of instructions coded to be executable by the processor 1110) and data during operation of the computer system 1102. Thus, the memory 1112 may be a relatively high performance, volatile, random access memory such as a dynamic random access memory ("DRAM") or static memory ("SRAM"). However, the memory 1112 may include any device for storing data, such as a disk drive or other nonvolatile storage device. Various examples may organize the memory 1112 into particularized and, in some cases, unique structures to perform the functions disclosed herein. These data structures may be sized and organized to store values for particular data and types of data.

Components of the computer system 1102 are coupled by an interconnection element such as the interconnection mechanism 1114. The interconnection element 1114 may include any communication coupling between system components such as one or more physical busses in conformance with specialized or standard computing bus technologies such as IDE, SCSI, PCI and InfiniBand. The interconnection element 1114 enables communications, including instructions and data, to be exchanged between system components of the computer system 1102.

The computer system 1102 also includes one or more interface devices 1116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1102 to exchange information and to communicate with external entities, such as users and other systems.

The data storage element 1118 includes a computer readable and writeable nonvolatile, or non-transitory, data storage medium in which instructions are stored that define a program or other object that is executed by the processor 1110. The data storage element 1118 also may include information that is recorded, on or in, the medium, and that is processed by the processor 1110 during execution of the program. More specifically, the information may be stored in one or more data structures specifically configured to conserve storage space or increase data exchange performance. The instructions may be persistently stored as encoded signals, and the instructions may cause the processor 1110 to perform any of the functions described herein. The medium may, for example, be optical disk, magnetic disk or flash memory, among others. In operation, the processor 1110 or some other controller causes data to be read from the nonvolatile recording medium into another memory, such as the memory 1112, that allows for faster access to the information by the processor 1110 than does the storage medium included in the data storage element 1118. The memory may be located in the data storage element 1118 or in the memory 1112, however, the processor 1110 manipulates the data within the memory, and then copies the data to the storage medium associated with the data storage element 1118 after processing is completed. A variety of components may manage data movement between the storage medium and other memory elements and examples are not limited to particular data management components. Further, examples are not limited to a particular memory system or data storage system.

Although the computer system 1102 is shown by way of example as one type of computer system upon which various aspects and functions may be practiced, aspects and functions are not limited to being implemented on the computer system 1102 as shown in FIG. 11. Various aspects and functions may be practiced on one or more computers having a different architectures or components than that shown in FIG. 11. For instance, the computer system 1102 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1102 may be a computer system including an operating system that manages at least a portion of the hardware elements included in the computer system 1102. In some examples, a processor or controller, such as the processor 1110, executes an operating system. Examples of a particular operating system that may be executed include a Windows-based operating system, such as, Windows NT, Windows 2000 (Windows ME), Windows XP, Windows Vista or Windows 7, 8, or 10 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources.

Many other operating systems may be used, and examples are not limited to any particular operating system.

The processor 1110 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A user interface system comprising:
   at least one processor;
   a user interface component, executed by the at least one processor, operable to display at least one user interface on a display of a client device, wherein the at least one user interface is configured to display and accept information from a database deployment through a plurality of views, wherein:
   the database deployment is one of a plurality of database deployments of a cloud-based database service, the plurality of database deployments comprising a cluster of one or more servers hosting one or more databases, and the plurality of database deployments includes a replica set configured to store a dataset and follow at least an eventual consistency model, wherein the replica set includes a primary data storage node that includes an operation log and at least one secondary data storage node configured to retrieve the operation log and replicate operations in the operation log;
   the at least one user interface is in communication with a back end of the database deployment through a communication link between the at least one user interface and the back end;
   the plurality of views including:
      a first view configured to:
         display a list of one or more databases in the database deployment; and
         accept selection of a database of the one or more databases;
      a database level view configured to:
         visualize information related to one or more collections in the database; and
         receive selection of a collection of the one or more collections; and
      a find view configured to:
         accept a query for data in the selected collection; and
         display a visual representation of the queried data; and wherein the user interface component is configured to:
bypass a database application to obtain the information related to one or more collections in the database;
store the queried data on the client device for a period of time after retrieval;
retransmit the query for execution responsive to a request to view the data after expiration of the period of time; and
retrieve the queried data from the client device responsive to a request to view the data prior to expiration of the period of time.

2. The user interface system of claim 1, wherein the first view is further configured to display a filterable list of the one or more databases for navigation.

3. The user interface system of claim 1, wherein the first view is further configured to display a total number of the one or more databases.

4. The user interface system of claim 1, wherein the plurality of views include an index view configured to display index information for one or more indexes of the selected collection.

5. The user interface system of claim 1, wherein the query results comprise one or more pages of retrieved data and the find view is further configured to:
display a single page of the one or more pages; and
provide page backward and page forward options to allow navigation through the one or more pages of the query results.

6. The user interface system of claim 1, wherein the user interface component is configured to display statistics associated with selected collection in a header of the at least one user interface.

7. The user interface system of claim 1, wherein the user interface component is configured to establish a communication link between the at least one user interface and the database deployment.

8. The user interface system of claim 7, wherein establishing the communication link between the at least one user interface and the database deployment comprises establishing a communication link with a plurality of agents running on a plurality of nodes and the user interface component is configured to:
retrieve information from a first intelligent agent of the plurality of intelligent agents running on a first node of the plurality of nodes;
receive an indication from the first intelligent agent that the first node is unavailable; and
retrieve, responsive to receiving the indication, information from a second intelligent agent of the plurality of agents running on a second node of the plurality of nodes.

9. The user interface system of claim 1, wherein the user interface component is configured to transmit the query to at least one intelligent agent configured to execute the query and retrieve the data.

10. The user interface system of claim 1, wherein the user interface component is configured to retrieve the information related to the one or more collections in the database in real time and update visualizations of the retrieved information responsive to real time information.

11. A computer-implemented method of generating a user interface, the method comprising:
displaying, by at least one processor, at least one user interface on a display of a client device, wherein the at least one user interface is configured to display and accept information from a database deployment through a plurality of views, wherein:
the database deployment is one of a plurality of database deployments of a cloud-based database service, the plurality of database deployments comprising a cluster of one or more servers hosting one or more databases, and the plurality of database deployments includes a replica set configured to store a dataset and follow at least an eventual consistency model, wherein the replica set includes a primary data storage node that includes an operation log and at least one secondary data storage node configured to retrieve the operation log and replicate operations in the operation log;
the at least one user interface is in communication with a back end of the database deployment through a communication link between the at least one user interface and the back end;
generating, by the at least one processor, a first view of the at least one user interface;
displaying, by the at least one processor in the first view, a list of one or more databases in the database deployment;
accepting, by the at least one processor via the first view, selection of a database of the one or more databases;
generating, by the at least one processor, a database level view of the at least one user interface;
visualizing, by the at least one processor in the database level view, information related to one or more collections in the database, comprising bypassing a database application to obtain the information related to one or more collections in the database;
receiving, by the at least one processor via the database level view, selection of a collection of the one or more collections;
generating, by the at least one processor, a find view of the at least one user interface;
accepting, by the at least one processor via the find view, a query for data in the selected collection;
displaying, by the at least one processor in the find view, a visual representation of the queried data;
storing, by the at least one processor, the queried data on the client device for a period of time after retrieval;
retransmitting, by the at least one processor, the query for execution responsive to a request to view the data after expiration of the period of time; and
retrieving, by the at least one processor, the queried data from the client device responsive to a request to view the data prior to expiration of the period of time.

12. The method of claim 11, further comprising displaying, in the first view, a filterable list of the one or more databases for navigation.

13. The method of claim 11, further comprising displaying, in the first view, a total number of the one or more databases.

14. The method of claim 11, further comprising generating an index view and displaying, in the index view, index information for one or more indexes of the selected collection.

15. The method of claim 11, further comprising:
displaying, in the find view, a page of one or more pages of the queried data; and
providing, in the find view, page backward and page forward options to allow navigation through the one or more pages of the queried data.

16. The method of claim 11, further comprising displaying statistics associated with selected collection in a header of the at least one user interface.

17. The method of claim 11, further comprising establishing a communication link between the at least one user interface and the database deployment.

18. The method of claim 17, wherein establishing the communication link between the at least one user interface and the database deployment comprises establishing a communication link with a plurality of agents running on a plurality of nodes and the method further comprises:
- retrieving information from a first intelligent agent of the plurality of intelligent agents running on a first node of the plurality of nodes;
- receiving an indication from the first intelligent agent that the first node is unavailable; and
- retrieving, responsive to receiving the indication, information from a second intelligent agent of the plurality of agents running on a second node of the plurality of nodes.

\* \* \* \* \*